US009029440B2

(12) United States Patent
Meyer et al.

(10) Patent No.: US 9,029,440 B2
(45) Date of Patent: May 12, 2015

(54) POLYMER COMPOSITION HAVING HEAT-ABSORBING PROPERTIES AND HIGH STABILITY TO WEATHERING

(75) Inventors: Alexander Meyer, Düsseldorf (DE);
Joerg Reichenauer, Krefeld (DE);
Andrea Scagnelli, Bonate Sotto (IT);
Vincenzo Taravella, Bergamo (IT)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/326,480

(22) Filed: Dec. 15, 2011

(65) Prior Publication Data

US 2012/0157587 A1 Jun. 21, 2012

(30) Foreign Application Priority Data

Dec. 17, 2010 (IT) .............................. RM2010A0669

(51) Int. Cl.
*C08K 5/34* (2006.01)
*C08K 5/00* (2006.01)
*C08K 3/00* (2006.01)
*C08K 3/04* (2006.01)

(52) U.S. Cl.
CPC ............. *C08K 5/0041* (2013.01); *C08K 3/0033* (2013.01); *C08K 3/04* (2013.01); *C08K 2201/011* (2013.01); *C08K 2201/014* (2013.01); *C08K 5/34* (2013.01)

(58) Field of Classification Search
CPC .......... C08K 3/0033; C08K 3/04; C08K 5/34; C08K 5/0041; C08K 2201/011; C08K 2201/014
USPC ................ 524/90, 91, 129, 311, 404, 88, 242
See application file for complete search history.

(56) References Cited

U.S. PATENT DOCUMENTS

| | | | |
|---|---|---|---|
| 2,889,327 A | 6/1959 | Howard | |
| 2,991,273 A | 7/1961 | Hechelhammer et al. | |
| 2,999,825 A | 9/1961 | Floyd et al. | |
| 2,999,846 A | 9/1961 | Schnell et al. | |
| 3,028,635 A | 4/1962 | Herubel | |
| 3,148,172 A | 9/1964 | Fox | |
| 3,271,367 A | 9/1966 | Schnell et al. | |
| 3,299,065 A | 1/1967 | Dien | |
| 3,728,124 A | 4/1973 | Whyte | |
| 3,846,369 A | 11/1974 | Whyte | |
| 4,035,958 A | 7/1977 | Nishio | |
| 4,101,513 A | 7/1978 | Fox et al. | |
| 4,185,009 A | 1/1980 | Idel et al. | |
| 4,395,463 A | 7/1983 | Kray | |
| 4,707,393 A | 11/1987 | Vetter | |
| 4,894,972 A | 1/1990 | Endoh et al. | |
| 4,982,014 A | 1/1991 | Freitag et al. | |
| 5,041,313 A | 8/1991 | Patel | |
| 5,116,706 A | 5/1992 | Kojima et al. | |
| 5,235,026 A | 8/1993 | Wulff et al. | |
| 5,239,406 A | 8/1993 | Lynam | |
| 5,288,778 A | 2/1994 | Schmitter et al. | |
| 5,349,040 A | 9/1994 | Trinks et al. | |
| 5,367,044 A | 11/1994 | Rosenquist | |
| 5,391,795 A | 2/1995 | Pickett | |
| 5,530,130 A | 6/1996 | Roschger et al. | |
| 5,574,078 A | 11/1996 | Elwakil | |
| 5,627,256 A | 5/1997 | Meier et al. | |
| 5,821,380 A | 10/1998 | Holderbaum et al. | |
| 5,846,659 A | 12/1998 | Lower et al. | |
| 5,869,185 A | 2/1999 | Bahr et al. | |
| 5,883,165 A | 3/1999 | Krohnke et al. | |
| 5,952,096 A | 9/1999 | Yamashita et al. | |
| 6,228,973 B1 | 5/2001 | McCloskey et al. | |
| 6,350,512 B1 | 2/2002 | Hurley et al. | |
| 6,355,723 B1 | 3/2002 | van Baal et al. | |
| 6,476,158 B1 | 11/2002 | England et al. | |
| 6,613,869 B1 | 9/2003 | Horn et al. | |
| 6,860,539 B2 | 3/2005 | Watanabe et al. | |
| 7,230,113 B2 | 6/2007 | Chauhan et al. | |
| 7,550,193 B2 | 6/2009 | Hu et al. | |
| 7,645,884 B2 | 1/2010 | Chauhan et al. | |
| 7,728,056 B2 | 6/2010 | Kuvshinnikova et al. | |
| 2002/0120092 A1 | 8/2002 | Kratschmer et al. | |
| 2003/0094600 A1 | 5/2003 | Dobler et al. | |
| 2003/0122114 A1 | 7/2003 | Dobler et al. | |
| 2003/0124351 A1* | 7/2003 | Sakamoto et al. ............ 428/401 |

(Continued)

FOREIGN PATENT DOCUMENTS

| | | | |
|---|---|---|---|
| CA | 1064191 | A1 | 10/1979 |
| DE | 995268 | | 1/1957 |
| DE | 10 31 512 | B | 6/1958 |
| DE | 1570703 | A1 | 2/1970 |
| DE | 1569613 | A1 | 6/1970 |
| DE | 2036052 | A1 | 1/1972 |
| DE | 2 063 050 | A1 | 7/1972 |
| DE | 2148101 | A1 | 4/1973 |
| DE | 2211956 | A1 | 10/1973 |
| DE | 2407674 | A1 | 10/1974 |
| DE | 25 00 092 | A1 | 7/1976 |

(Continued)

OTHER PUBLICATIONS

International Search Report dated Jan. 20, 2012.

(Continued)

*Primary Examiner* — Kriellion Sanders

(74) *Attorney, Agent, or Firm* — Drinker Biddle & Reath LLP

(57) ABSTRACT

The present invention relates to a polymer composition including a transparent thermoplastic plastic, an inorganic infrared absorber, also referred to as IR absorber hereinbelow, optionally an inorganic nano-scale pigment, and the combination of at least one organic coloring agent of a specific structure, and to the preparation and use of the polymer compositions according to the invention and to products produced therefrom.

9 Claims, No Drawings

(56) References Cited

U.S. PATENT DOCUMENTS

| | | | |
|---|---|---|---|
| 2004/0097662 A1* | 5/2004 | Gaggar et al. | 525/469 |
| 2004/0131845 A1 | 7/2004 | Fujita | |
| 2004/0164446 A1 | 8/2004 | Goossens et al. | |
| 2005/0119377 A1 | 6/2005 | Ishii et al. | |
| 2005/0161642 A1 | 7/2005 | Takeda | |
| 2005/0250915 A1 | 11/2005 | Heuer et al. | |
| 2006/0105053 A1 | 5/2006 | Marx et al. | |
| 2006/0178254 A1 | 8/2006 | Takeda et al. | |
| 2006/0234061 A1 | 10/2006 | Buckel et al. | |
| 2007/0015081 A1* | 1/2007 | van den Bogerd et al. | 430/270.1 |
| 2007/0210287 A1 | 9/2007 | Guerra | |
| 2008/0081896 A1 | 4/2008 | Heuer | |
| 2008/0103267 A1 | 5/2008 | Hurst et al. | |
| 2008/0132618 A1 | 6/2008 | Eckel et al. | |
| 2008/0258338 A1 | 10/2008 | Seidel et al. | |
| 2009/0062424 A1 | 3/2009 | Hein | |
| 2009/0136730 A1 | 5/2009 | Nakano et al. | |
| 2009/0258978 A1 | 10/2009 | Ruediger et al. | |
| 2010/0028640 A1* | 2/2010 | Isozaki et al. | 428/220 |
| 2010/0242792 A1 | 9/2010 | Loebel | |
| 2011/0293921 A1 | 12/2011 | Meyer et al. | |
| 2012/0021152 A1 | 1/2012 | Glaser et al. | |

FOREIGN PATENT DOCUMENTS

| | | |
|---|---|---|
| DE | 2804283 A1 | 8/1978 |
| DE | 3121385 A1 | 8/1982 |
| DE | 3742881 A1 | 7/1988 |
| DE | 3832396 A1 | 2/1990 |
| DE | 42 40 313 A1 | 6/1994 |
| DE | 19636032 A1 | 3/1998 |
| DE | 19 943 642 A1 | 3/2001 |
| DE | 10006208 A1 | 8/2001 |
| DE | 10022037 A1 | 11/2001 |
| DE | 10311063 A1 | 9/2004 |
| DE | 10392543 T5 | 4/2005 |
| DE | 102006055479 A1 | 5/2008 |
| DE | 102007011069 A1 | 9/2008 |
| EP | 0 110 238 A2 | 6/1984 |
| EP | 0110221 A2 | 6/1984 |
| EP | 0 481 319 A2 | 4/1992 |
| EP | 0 500 496 A1 | 8/1992 |
| EP | 0517044 A2 | 12/1992 |
| EP | 0 570 165 A2 | 11/1993 |
| EP | 0639624 A1 | 2/1995 |
| EP | 0 716 919 A2 | 6/1996 |
| EP | 0718354 A2 | 6/1996 |
| EP | 0839623 A1 | 5/1998 |
| EP | 1308084 A1 | 5/2003 |
| EP | 1506249 A1 | 2/2005 |
| EP | 1559743 A1 | 8/2005 |
| EP | 1582549 A1 | 10/2005 |
| EP | 1624012 A1 | 2/2006 |
| EP | 1865027 A1 | 12/2007 |
| EP | 2009057 A1 | 12/2008 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| JP | 61-062039 | 3/1986 |
| JP | 61-062040 | 3/1986 |
| JP | 61-105550 | 5/1986 |
| JP | 4328154 A | 11/1992 |
| JP | 07033969 A | 2/1995 |
| JP | 2003-277045 A | 10/2003 |
| JP | 2005-047179 A | 2/2005 |
| JP | 2005344006 A | 12/2005 |
| JP | 2006249345 A | 9/2006 |
| JP | 2006-307172 A | 11/2006 |
| JP | 2007-169503 A | 7/2007 |
| JP | 2008-156386 A | 7/2008 |
| JP | 2008-214596 A | 9/2008 |
| WO | WO-96/15102 A2 | 5/1996 |
| WO | WO-0226862 A1 | 4/2002 |
| WO | WO-03/074584 A1 | 9/2003 |
| WO | WO-2005030851 A1 | 4/2005 |
| WO | WO-2005037932 A1 | 4/2005 |
| WO | WO-2005113639 A1 | 12/2005 |
| WO | WO-2006/108520 A1 | 10/2006 |
| WO | WO-2007/008476 A2 | 1/2007 |
| WO | WO-2007/067462 A1 | 6/2007 |
| WO | WO-2007/130607 A1 | 11/2007 |
| WO | WO-2008037364 A1 | 4/2008 |
| WO | WO-2008/071363 A2 | 6/2008 |
| WO | WO-2008/109072 A1 | 9/2008 |
| WO | WO-2008122359 A1 | 10/2008 |
| WO | WO-2008/134517 A1 | 11/2008 |
| WO | WO-2009/064860 A1 | 5/2009 |
| WO | WO-2009 074504 A2 | 6/2009 |
| WO | WO-2010/092013 A1 | 8/2010 |
| WO | WO-2011/141369 A1 | 11/2011 |

OTHER PUBLICATIONS

U.S. Appl. No. 13/326,459.
U.S. Appl. No. 13/326,419.
U.S. Appl. No. 13/326,438.
International Search Report and Written Opinion for PCT/EP2011/072909 dated Jan. 18, 2012.
International Search Report and Written Opinion for PCT/EP2011/072913, dated Feb. 6, 2012.
Italian Search Report for IT RM20100670 dated Dec. 5, 2011.
Translation of DE2148101, 2013.
International Search Report of Jun. 14, 2012.

* cited by examiner

POLYMER COMPOSITION HAVING HEAT-ABSORBING PROPERTIES AND HIGH STABILITY TO WEATHERING

CROSS REFERENCE TO RELATED APPLICATIONS

Priority is claimed to Italian patent Application No. RM 2010A000669 filed on Dec. 17, 2010, which is incorporated herein by reference it its entirety for all useful purposes.

BACKGROUND

Embodiments of the invention relate to a polymer composition which absorbs infrared radiation (IR), containing a transparent thermoplastic plastic, an inorganic infrared absorber, also referred to as IR absorber hereinbelow, optionally an inorganic nano-scale pigment, and the combination of at least one organic colouring agent of a specific structure, and to the preparation and use of the polymer compositions according to the invention and to products produced therefrom. In particular, embodiments of the present invention relate to compositions which have high stability—in particular also high colour stability—to weathering both in the visible range and in the IR range. Embodiments of the invention relate further to the use of the polymer composition according to the invention containing such IR absorber/colouring agent combinations in the production of glazing for use in buildings, motor vehicles and railway vehicles or aircraft.

In particular, embodiments of the invention relate to compositions for glazing elements which have a comparatively high light transmission in the range from 15 to 80%.

Glazing made from compositions containing transparent thermoplastic polymers such as, for example, polycarbonate offer many advantages over conventional glazing made of glass for use in the automotive sector and for buildings. Such advantages include, for example, increased break resistance and/or weight saving, which in the case of automotive glazing permit greater safety for the occupants in the event of road traffic accidents and a lower fuel consumption. Finally, transparent materials containing transparent thermoplastic polymers permit substantially greater freedom in terms of design because they are easier to mould.

It is a disadvantage, however, that the high heat transmissibility (i.e. transmissibility for IR radiation) of transparent thermoplastic polymers leads to undesirable heating of the inside of motor vehicles and buildings under the action of the sun. The raised temperatures on the inside reduce the comfort for the occupants or residents and can involve increased demands in terms of air conditioning, which in turn increase the energy consumption and thus eliminate the positive effects again. In order nevertheless to meet the demand for low energy consumption coupled with a high degree of comfort for the occupants, glazing provided with appropriate heat protection is required. This is true for the automotive sector in particular.

As has long been known, the largest part of solar energy, apart from the visible range of light between 400 nm and 750 nm, is accounted for by the near-infrared (NIR) range between 750 nm and 2500 nm. Penetrating solar radiation is absorbed inside a car, for example, and emitted as long-wave heat radiation having a wavelength of from 5 μm to 15 μm. Because conventional glazing materials—in particular thermoplastic polymers that are transparent in the visible range—are not transparent in that range, the heat radiation is unable to radiate to the outside. A greenhouse effect is obtained and the interior heats up. In order to keep this effect to a minimum, the transmission of the glazing in the NIR should therefore be minimised as far as possible. Conventional transparent thermoplastic polymers such as, for example, polycarbonate are, however, transparent both in the visible range and in the NIR.

Additives, for example, which exhibit as low a transparency as possible in the NIR without adversely affecting the transparency in the visible range of the spectrum are therefore required.

Of the transparent thermoplastic plastics, polymers based on polymethyl methacrylate (PMMA) and polycarbonate are particularly suitable for use as a glazing material. Because of its high strength, polycarbonate in particular has a very good property profile for such uses.

In order to impart infrared-absorbing properties to these plastics, corresponding infrared absorbers are therefore used as additives. IR absorber systems which have a broad absorption spectrum in the NIR range (near-infrared, 750 nm-2500 nm) while at the same time having low absorption in the visible range (low inherent colour) are of particular interest for that purpose. The corresponding polymer compositions should additionally have high heat stability as well as excellent light stability.

A large number of IR absorbers based on organic or inorganic materials which can be used in transparent thermoplastics are known.

IR-absorbing additives based on organic materials frequently have the disadvantage, however, that they exhibit poor stability towards thermal stress or radiation. Accordingly, many of these additives do not have sufficient heat stability to be incorporated into transparent thermoplastics because temperatures of up to 350° C. are required for their processing. Moreover, during use, glazing is often exposed for prolonged periods to temperatures of more than 50° C., caused by solar radiation, which can lead to decomposition or degradation of the organic absorbents.

Furthermore, organic IR absorbers frequently do not have a sufficiently broad absorption band in the NIR range, so that their use as IR absorbers in glazing materials is inefficient. IR-absorbing additives based on inorganic materials are frequently markedly more stable as compared with organic additives. The use of such systems is often also more economical because in most cases they have a markedly more favourable price/performance ratio. Accordingly, materials based on finely divided borides, finely divided tungstates or materials based on antimony-doped tin oxide (ATO) or indium tin oxide (ITO) have proved to be efficient IR absorbers because they have a relatively broad absorption band in the IR range.

However, IR absorbers do not cover the entire IR range—even if they exhibit a broad absorption band in the IR range. Furthermore, they exhibit no or only low absorption in the visible range. In addition, about 50% of the energy introduced into a building or a vehicle through a window is caused by radiation in the visible range of the spectrum (400 nm-750 nm). In addition to IR absorbers, it is therefore necessary also to use other pigments and/or colourants which absorb in the visible range of light in order to ensure a low total energy transmission.

Embodiments of the present invention relates to glazing materials which exhibit high transmission in the visible range and low transmission in the IR range. Such glazing is suitable especially for the transport and infrastructure sector. Such glazing is to allow the user a good view owing to the high transmission in the visible range of the spectrum. This is necessary, for example, when a good view of the surroundings is necessary, for example when driving a motor vehicle. However, because a large part of the energy introduced into the interior is caused by radiation in the visible range of the spectrum, it is very important to minimise energy transmission in the IR range in order correspondingly to limit the total energy transmission. In almost every case, however, the inorganic IR absorbers, which effectively limit energy transmission in the IR range, exhibit an inherent colour. The inherent colour is frequently undesirable and must be corrected by further colouring agents. However, such colouring agents must have high light fastness because otherwise, after a certain period of use of the glazing element, the inherent colour of the IR absorber comes to bear again as a result of bleaching out of the colourants.

Glazing which is used in the transport or infrastructure sector must accordingly have a long service life and must not become brittle during that time. In addition, the colour and transparency, like the IR properties, i.e. the protection against heat radiation, should not change or should change only slightly over the lifetime of the glazing. Furthermore, the glazing must have sufficient scratch resistance.

Because of the very long service life that is required, glass is frequently used as glazing material. Glass is insensitive to UV radiation, has low sensitivity to scratching and does not change the mechanical properties over long periods. Because stable inorganic oxides, such as, for example, iron oxide, are used as pigments and IR absorbers, the IR and colour properties also remain virtually unchanged over long periods. The use of such pigments in thermoplastic materials is not possible, however, because it leads to clouding and/or degradation of the corresponding matrix.

Because of the above-described advantages of plastics, there is therefore a need for materials which exhibit both the good physical properties of thermoplastics and the high colour and IR stability of correspondingly coloured glass.

In order to improve the service life of thermoplastic materials, it is known to provide them with UV protection and/or scratch-resistant coatings. Moreover, a large number of colouring agents which have high light fastness are known. Inorganic IR absorbers are to be preferred over organic IR absorbers because they usually have higher stability.

It has been shown, however, that the thermoplastic compositions mentioned in the prior art are only inadequately suitable when extraordinarily high colour and IR stability is required. This is the case, for example, when glass glazing and glazing of thermoplastic material are installed together. It is shown here that the colour and IR stability of glass is superior to that of the thermoplastic material. Colour deviations occur in particular when these materials are installed next to one another.

Relatively new is the requirement that the solar direct transmittance "Direct Solar Energy Transmitted to the inside of a Glazing" ($T_{DS}$, measured according to ISO 13837) or the solar total transmittance "Total Solar Energy Transmitted to the Inside of a Glazing" ($T_{TS}$, determined according to Appendix B of ISO 13837 whereby a vertical arrangement for a stationary vehicle (according to Appendix B.2 of ISO 13837) and the coefficients for single glazing indicated under "Note 2" in Appendix B.2 of ISO 13837 were used) of a glazing must achieve specific values and that those values must not change substantially over the lifetime of a glazing. Such requirements will increasingly be made in future because of climate protection.

The object was, therefore, to provide a composition based on a thermoplastic material which has a high IR performance combined with good transmission properties in the visible range. In addition, such compositions must ensure that specific characteristic values in respect of the solar direct transmittance or solar total transmittance of automotive or infrastructure glazing are observed. The characteristic values are to be observed not only at the beginning but over a long service life.

The bleaching out of colouring agents not only leads to a change in the colour properties but also results in the occurrence of a higher energy transmission. This in turn means that the required transmission values can no longer be observed. Although a change in the IR range is visually unobtrusive, such a change can likewise lead to a change in the performance data as regards the $T_{DS}$ value or the $T_{TS}$ value. The associated increased heat input into the building or the interior of the vehicle is undesirable because the performance of the air conditioning has to be increased.

It is frequently necessary to configure the colouring of the moulded body in a specific colour. Because the atmosphere of the interior or the interior fittings is affected by intensely coloured glazing, the colouring of the glazing is to be as neutral as possible or as specified by the customer.

It must be possible to process the composition at the temperatures conventional for thermoplastics without the colour or the performance data changing markedly during the processing.

Compositions based on polycarbonate containing boride- and/or tungstate-based inorganic IR absorbers have been described in various publications.

WO 2007/008476 A1 discloses moulding compositions which are suitable in particular for spectacles and which contain boride-based IR absorbers and specific carbon blacks; by combining those components, a synergistic effect in respect of the IR-absorbing properties is said to be achieved. However, this application says nothing about the weathering stability and the stability of the colouring agents.

JP 2005-047179, JP 2005344006, JP2006249345, EP 1865027 A1, JP07033969, JP 2008214596 and EP2009057 A1 mention compositions containing boride-based IR absorbers in combination with specific anthraquinone-based colouring agents. However, no stable colouring agent combinations within the scope of the present invention are disclosed.

JP 2006-307172 and JP 2007-169503 describe compositions containing inorganic IR absorbers and various colourants from the group of the anthraquinones, phthalocyanines or perinones, nothing being said about the weathering stability of the colourants or specific colourant combinations.

JP 2008-156386 discloses indanthrene colouring agents in compositions containing IR absorbers.

U.S. Pat. No. 6,476,158 describes covered, i.e. non-transparent, polycarbonate-polyester compositions which have particularly high weathering stability and maintenance of the surface gloss. Transparent compositions as in the present invention are not described, however.

None of the above-mentioned documents describes weathering properties of the compositions, the colouring agent combinations according to the invention or the colour and IR stability, and a solution for the problem underlying the present invention is accordingly not rendered obvious.

In the prior art, many colourants have been described as being particularly fast to light and accordingly also stable. The light fastness (determined at ⅓ standard depth with 1% $TiO_2$ (PS 2% $TiO_2$ according to DIN EN ISO 4892-2; transparent colourations with 0.05% colourant; evaluated with 8-step blue wool scale) of the so-called Macrolex colourants (Lanxess datasheets; Technical Information, Lanxess Deutschland GmbH, Functional Chemicals, High Performance Additives, Colorants, 51369 Leverkusen, Germany) such as, for example, the colourants Macrolex® Blue RR (Solvent Blue 97), Macrolex® Violet 3R (Solvent Violet 36), which are intended for use in polycarbonate, has been categorised as 7-8 (8=maximum value). Nevertheless, it has been shown within the context of the present tests that, in polycarbonate compositions, colourants formally categorised as being fast to light do not exhibit the stability according to the invention on weathering.

It has been shown, however, that the object stated above cannot be achieved by means of those colouring agents, or the corresponding literature gives no guidance for the choice and combination of those colouring agents with specific IR absorbers for achieving the object, in order to achieve the required characteristic values as regards light transmission and total energy transmission.

The object was, therefore, to provide a composition based on a thermoplastic material which exhibits a high IR performance in combination with good transmission properties in the visible range and high colour and weathering stability. In particular, the composition is to exhibit high transmission values in the visible range. These characteristic values are to change only slightly over the lifetime.

Furthermore, the composition according to embodiments of the invention is to exhibit no or only slight haze.

It was a further object of the present invention to provide compositions for the production of multi-layer articles and mouldings.

Surprisingly, it has been possible to achieve the object by means of compositions according to claim 1 of the present invention, which contain a combination of specific colouring agents, optionally inorganic nano-scale pigments and specific IR absorbers.

BRIEF DESCRIPTION OF EMBODIMENTS

An embodiment of the present invention relates to a polymer composition comprising
  a. at least one transparent thermoplastic plastic;
  b. at least one inorganic IR absorber selected from the group consisting of boride compounds, tungstates, and mixtures thereof,
  c. optionally an inorganic, nano-scale pigment,
  d. a colouring agent or a colouring agent combination having structures selected from:
    I. (1a) and/or (1b), (4), (2a) and/or (2b)
    II. (1a) and/or (1b), (5), (2a) and/or (2b)
    III. (1a) and/or (1b), (7)
    IV. (1a) and/or (1b), (4), (7)
    V. (1a) and/or (1b), (5), (7)
    VI. (4), (2a) and/or (2b)
    VII. (5), (2a) and/or (2b)
    VIII. (2a) and/or (2b), (4), (6)
    IX. (2a) and/or (2b), (5), (6)
    X. (3), (4)
    XI. (3), (5)
    XII. (3), (4), (6)
    XIII. (3), (5), (6)
    XIV. (3), (4), (7)
    XV. (3), (5), (7)
    XVI. (3), (4), (2a) and/or (2b)
    XVII. (3), (5), (2a) and/or (2b)
    XVIII. (6), (1a) and/or (1b)
    XIX. (6), (1a) and/or (1b), (7)
    XX. (1a) and/or (1b), (8)
    XXI. (7), (4)
    XXII. (7), (5)
    XXIII. (1a) and/or (1b),
    XXIV. (2a) and/or (2b),
    XXV. (7)
    XXVI. (2a) and/or (2b), (7).

wherein the structures are as follows:

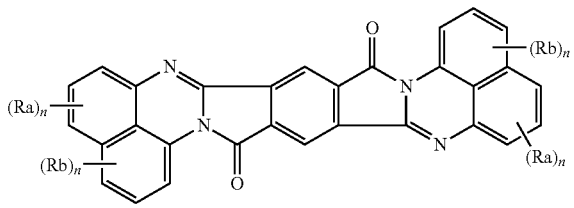

(1a)

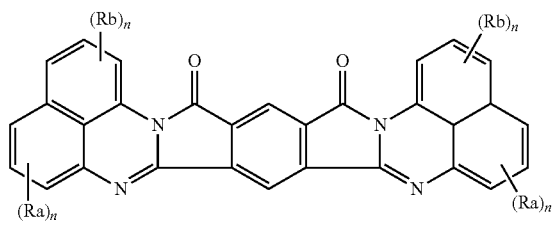

(1b)

wherein
Ra and Rb, independently of one another, represent a linear or branched alkyl radical, or halogen;
n, independently of the respective R, represents a natural number from 0 to 3, the radical for n=0 being H;

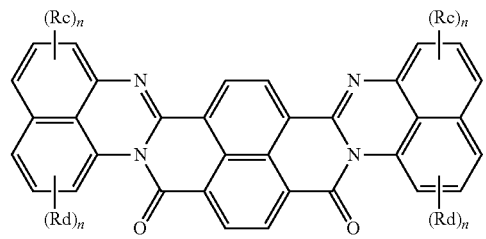

(2a)

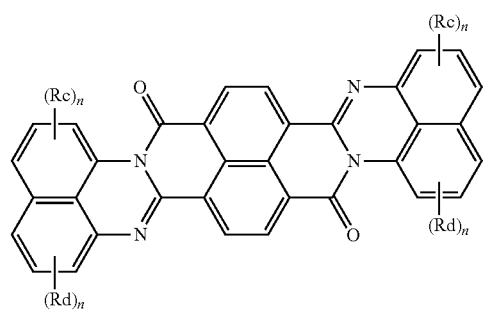

(2b)

wherein
Rc and Rd, independently of one another, represent a linear or branched alkyl radical, or halogen;
n, independently of the respective R, represents a natural number from 0 to 3, the radical for n=0 being H;

(3)

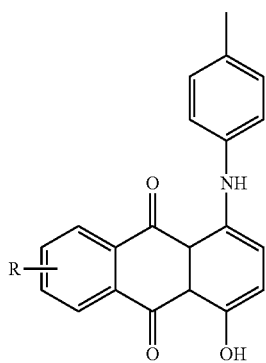

wherein
R represents H or a p-methylphenylamine radical;

(4)

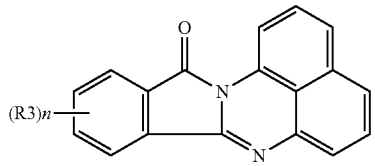

wherein
R3 represents a halogen;
n=4;

(5)

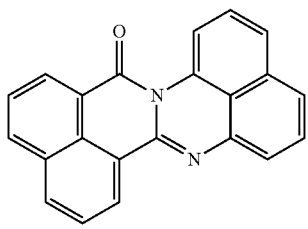

(6)

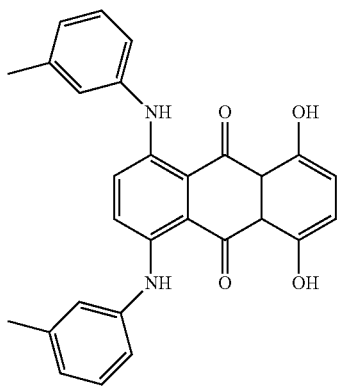

-continued (7)

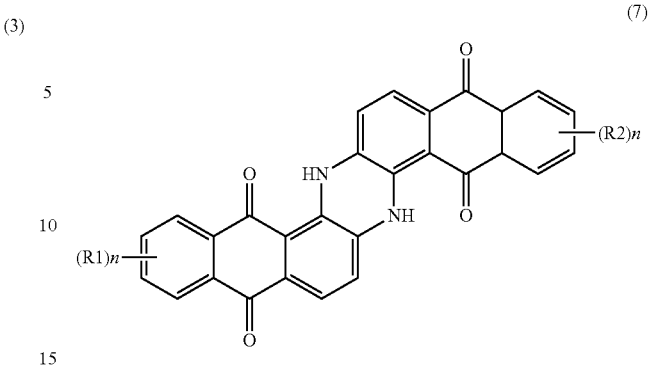

wherein
R1 and R2, independently of one another, represent a linear or branched alkyl radical, or halogen;
n represents a natural number from 0 to 4;

(8a)

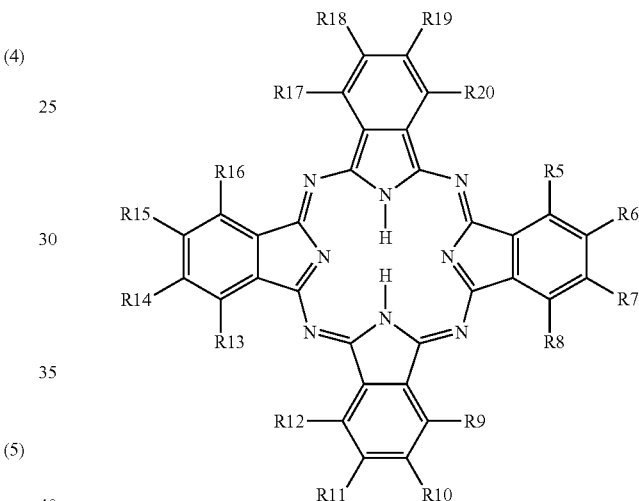

(8b)

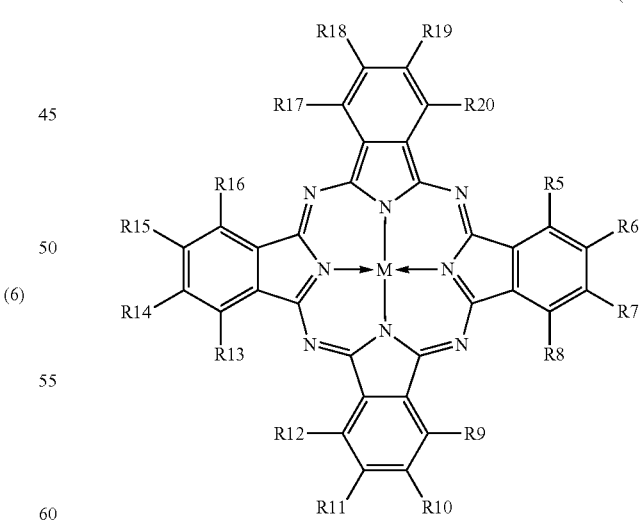

wherein
the radicals R(5-20), independently of one another, represents hydrogen, methyl, ethyl, propyl, isopropyl, butyl, isobutyl, tert-butyl, pentyl, neopentyl, hexyl, thexyl, fluorine, chlorine, bromine, sulfone or CN, and
M represents aluminium, nickel, cobalt, iron, zinc, copper or manganese.

DETAILED DESCRIPTION OF EMBODIMENTS

As used herein, the singular terms "a" and "the" are synonymous and used interchangeably with "one or more" and "at least one," unless the language and/or context cleary indicates otherwise. Accordingly, for example, reference to "an IR absorber" herein or in the appended claims can refer to a single IR absorber or more than one IR absorber. Additionally, all numerical values, unless otherwise specifically noted, are understood to be modified by the word "about."

The polymer composition according to embodiments of the invention contains the components:

a) a transparent thermoplastic plastic, preferably polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copoly-acrylates and poly- or copoly-methacrylate such as, for example, poly- or copoly-methyl methacrylates (such as PMMA) as well as copolymers with styrene such as, for example, transparent polystyrene-acrylonitrile (PSAN), thermoplastic polyurethanes, polymers based on cyclic olefins (e.g. TOPAS®, a commercial product of Ticona), more preferably polycarbonate, copolycarbonate, polyester carbonate, aromatic polyesters or polymethyl methacrylate, or mixtures of the mentioned components, and particularly preferably polycarbonate and copolycarbonate, the transparent thermoplastic plastic being added in an amount such that, with components b) to i), it yields 100 wt. %.

b) an inorganic IR absorber from the group of the boride compounds of the type $M_xB_y$ (M=La, Ce, Pr, Nd, Tb, Dy, Ho, Y, Sm, Eu, Er, Tm, Yb, Lu, Sr, Ti, Zr, Hf, V, Ta, Cr, Mo, W and Ca; and x and y are an integer from 1 to 6), preference being given to lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride (CrB and $CrB_2$), molybdenum boride ($MoB_2$, $Mo_2B_5$ and MoB), tungsten boride ($W_2B_5$), or combinations of those borides. Borides based on lanthanum hexaboride ($LaB_6$) or mixtures containing lanthanum hexaboride are most particularly preferred.

Preferably, the borides are used in an amount of from 0.00150 wt. % to 0.01500 wt. %, preferably from 0.00180 wt. % to 0.01100 wt. % and particularly preferably from 0.0020 wt. % to 0.00900 wt. %, calculated as solids content of boride in the polymer composition as a whole. In a particular embodiment, which can contain further colouring agents, the borides are used in an amount of preferably from 0.00350 wt. % to 0.00850 wt. % and particularly preferably from 0.00400 wt. % to 0.00800 wt. %, calculated as solids content of boride in the polymer composition as a whole.

Solids content of boride means in this connection boride as the pure substance and not a suspension or other preparation containing the pure substance, and/or an inorganic IR absorber from the group of the tungsten compounds of type b1) WyOz (W=tungsten, O=oxygen; z/y=2.20-2.99) and/or b2) MxWyOz (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), the elements H, Cs, Rb, K, Tl, In, Ba, Li, Ca, Sr, Fe and Sn being preferred as M, of which Cs is most particularly preferred. Particular preference is given to $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and mixtures thereof. In a particular embodiment of the present invention, the sole use of $Cs_{0.33}WO_3$ as the inorganic IR absorber is most particularly preferred. Likewise preferred are Cs/W ratios of 0.20 and 0.25, the above-mentioned tungsten compounds of type b1) and b2) being referred to as tungstates hereinbelow;

The IR-absorbing inorganic tungstate is preferably dispersed in an organic matrix. Preferably, the tungstates are used in an amount of from 0.0075 wt. % to 0.0750 wt. %, preferably from 0.0100 wt. % to 0.0500 wt. % and particularly preferably from 0.0125 wt. % to 0.0375 wt. %, calculated as solids content of tungstate in the polymer composition as a whole. Solids content of tungstate means in this connection tungstate as the pure substance and not a suspension or other preparation containing the pure substance.

Zinc-doped caesium tungstates are preferably used when tungstates alone are used as IR absorbers.

There is preferably used under point b) an IR absorber based either on a boride or on a tungstate.

c) from 0 wt. % to 0.00350 wt. %, preferably from 0 wt. % to 0.00135 wt. %, more preferably from 0 wt. % to 0.00130 wt. %, and particularly preferably from 0.00001 wt. % to 0.00128 wt. %, of an inorganic, nano-scale pigment, preferably carbon black.

In a particular embodiment, which can contain further colouring agents, the carbon black is used preferably in an amount of from 0.00040 wt. % to 0.00135 wt. %, particularly preferably in an amount of from 0.00050 wt. % to 0.00130 wt. %, d) colouring agents or colouring agent combinations (commas are to be read as "and"):

I. (1a) and/or (1b), (4), (2a) and/or (2b)
II. (1a) and/or (1b), (5), (2a) and/or (2b)
III. (1a) and/or (1b), (7)
IV. (1a) and/or (1b), (4), (7)
V. (1a) and/or (1b), (5), (7)
VI. (4), (2a) and/or (2b)
VII. (5), (2a) and/or (2b)
VIII. (2a) and/or (2b), (4), (6)
IX. (2a) and/or (2b), (5), (6)
X. (3), (4)
XI. (3), (5)
XII. (3), (4), (6)
XIII. (3), (5), (6)
XIV. (3), (4), (7)
XV. (3), (5), (7)
XVI. (3), (4), (2a) and/or (2b)
XVII. (3), (5), (2a) and/or (2b)
XVIII. (6), (1a) and/or (1b)
XIX. (6), (1a) and/or (1b), (7)
XX. (1a) and/or (1b), (8)
XXI. (7), (4)
XXII. (7), (5)
XXIII. (1a) and/or (1b),
XXIV. (2a) and/or (2b),
XXV. (7)
XXVI. (2a) and/or (2b), (7), the above-mentioned structures being defined as follows:

d1)

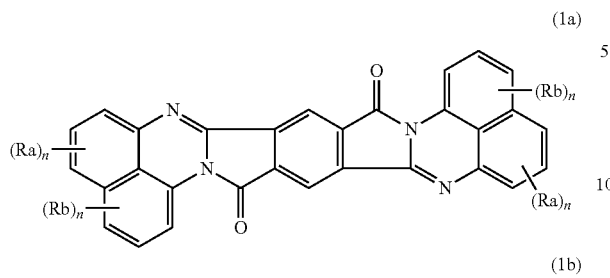

(1a)

(1b)

wherein

Ra and Rb independently of one another represent a linear or branched alkyl radical, or halogen, preferably methyl, ethyl, propyl, isopropyl, butyl, isobutyl, tert-butyl, pentyl, neopentyl, hexyl, thexyl, or Cl, more preferably methyl, Cl and particularly preferably Cl.

n independently of the respective R represents a natural number from 0 to 3, the radical for n=0 being hydrogen.

In a preferred embodiment, Ra and/or Rb is Cl and is in the o- and/or p-position relative to the carbon atoms which carry the amine functionalities, such as, for example, di-orthochloronaphthalino-, di-ortho, mono-para-chloronaphthalino, and mono-ortho-naphthalino. Furthermore, in a preferred embodiment Ra and Rb each represents a tert-butyl radical which is preferably in the meta-position relative to the carbon atoms which carry the nitrogen functionalities.

In a particularly preferred embodiment, n=0 in all the rings, so that every Ra and Rb=H.

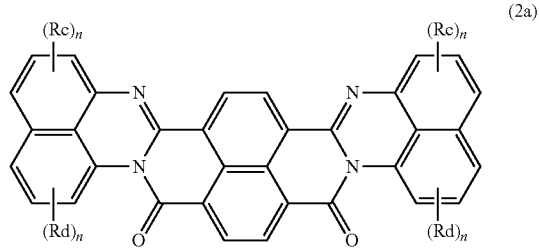

(2a)

(2b)

wherein

Rc and Rd independently of one another represent a linear or branched alkyl radical, or halogen, preferably methyl, ethyl, propyl, isopropyl, butyl, isobutyl, tert-butyl, pentyl, neopentyl, hexyl, thexyl, or Cl, more preferably methyl, Cl and particularly preferably Cl.

n independently of the respective R represents a natural number from 0 to 3, the radical for n=0 being hydrogen.

In a preferred embodiment, Rc and/or Rd is Cl and is in the o- and/or p-position relative to the carbon atoms which carry the amine functionalities, such as, for example, di-orthochloronaphthalino-, di-ortho, mono-para-chloronaphthalino, and mono-ortho-naphthalino. Furthermore, in a preferred embodiment Rc and Rd each represents a tert-butyl radical which is preferably in the meta-position relative to the carbon atoms which carry the nitrogen functionalities.

In a particularly preferred embodiment, n=0 in all the rings, so that every Rc and Rd=H.

The structures (1a) and (1b) and (2a) and (2b) behave isomerically with respect to one another. The respective isomers can be used on their own or in a mixture. In a particular embodiment, a 1:1 isomer mixture (based on the amount of the isomer in the isomer mixture in wt. %) of (1a) and (1b) or (2a) and (2b) is used.

The preparation of such colouring agents has been described, for example, in DE 2148101 or WO 2009 074504 A1.

The composition according to the invention preferably contains at least one colouring agent of structures (1a), (1b), (2a) and (2b), the colouring agents of structures (1a) and (1b) being particularly preferred.

In a further embodiment, the structures (1a), (1b), (2a) and (2b) are each used as pure isomers, it being possible for the pure isomers to be obtained, for example, by preparative HPLC.

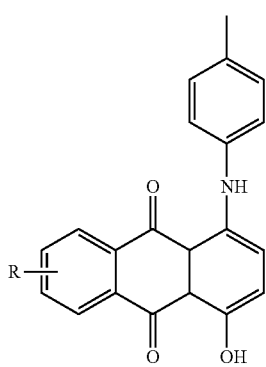

(3)

R is selected from the group consisting of H and p-methylphenylamine radical; preferably R=H.

Such colouring agents are obtainable, for example, from Lanxess AG under the trade name Macrolex® Violet B. In a particular embodiment, no colouring agent of structure (3) is used.

and d2)

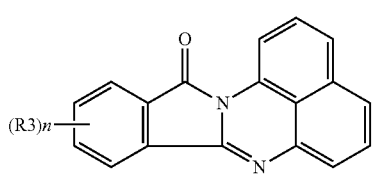

(4)

wherein R3 represents preferably halogen and particularly preferably Cl, n particularly preferably being 4. Further preferred is an embodiment wherein n=0, so that R3=H.

Such colouring agents are obtainable, for example, from Lanxess AG as Macrolex® Orange 3G or Macrolex® Red EG.

When R3 represents Cl and n=4, it is possible to use instead of the colouring agent of the structure (4) the colouring agent of the structure (5) in order to achieve the same colour properties:

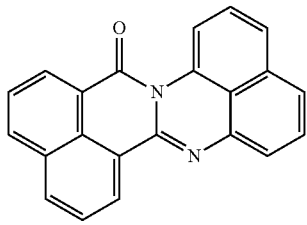
(5)

Such colouring agents are obtainable, for example, from Lanxess AG under the trade name Macrolex® Red E2G.

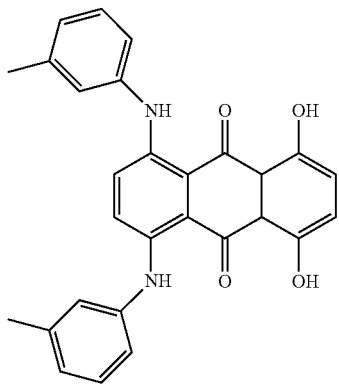
(6)

Such colouring agents are obtainable, for example, from Lanxess AG under the trade name Macrolex® Green G.

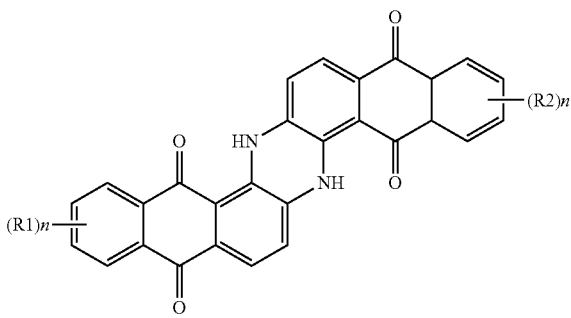
(7)

wherein
R1 and R2 independently of one another represent a linear or branched alkyl radical, or halogen, preferably methyl, ethyl, propyl, isopropyl, butyl, isobutyl, tert-butyl, pentyl, neopentyl, hexyl, thexyl, or Cl, more preferably methyl, Cl and particularly preferably Cl.

n represents a natural number from 0 to 4.

In a particularly preferred embodiment, n=0 in all the rings, so that every R1 and R2=H.

Colouring agents of this structure (7) are obtainable commercially from the Paliogen Blue series of BASF AG.

When colouring agents of structure (7) are used, particular preference is given to pigments having a bulk volume (determined according to DIN ISO 787-11) of from 2 l/kg to 10 l/kg, preferably from 3 l/kg to 8 l/kg, a specific surface area (determined according to DIN 66132) of from 5 $m^2/g$ to 60 $m^2/g$, preferably from 10 $m^2/g$ to 55 $m^2/g$, and a pH value (determined according to DIN ISO 787-9) of from 4 to 9.

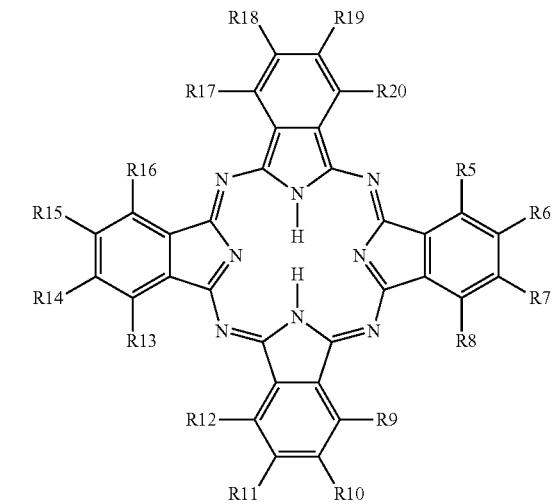
(8a)

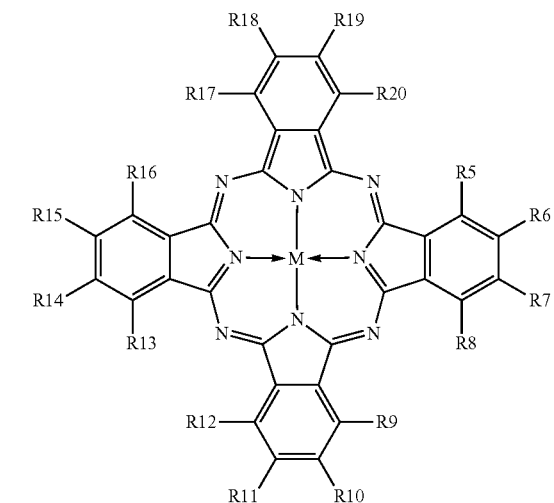
(8b)

The radicals R(5-20) are each independently of the others hydrogen, methyl, ethyl, propyl, isopropyl, butyl, isobutyl, tert-butyl, pentyl, neopentyl, hexyl, thexyl, fluorine, chlorine, bromine, sulfone, CN.

R(5-20) is preferably the same in all positions. More preferably, R(5-20) in all positions is H. In an alternative embodiment, R(5-20) in all positions is Cl.

M is preferably aluminium (where R=H: aluminium phthalocyanine, CAS: 14154-42-8), nickel (where R=H: nickel phthalocyanine, CAS: 14055-02-8), cobalt (where R=H: cobalt phthalocyanine, CAS: 3317-67-7), iron (where R=H:

iron phthalocyanine, CAS: 132-16-1), zinc (where R=H: zinc phthalocyanine, CAS: 14320-04-08), copper (where R=H: copper phthalocyanine, CAS: 147-14-8; where R=H and Cl: polychloro copper phthalocyanine, CAS: 1328-53-6; where R=Cl: hexadecachlorophthalocyanine, CAS: 28888-81-5; where R=Br: hexadecabromophthalocyanine, CAS: 28746-04-5), manganese (where R=H: manganese phthalocyanine, CAS: 14325-24-7).

The combination of M=Cu and R=H is particularly preferred for all positions. Accordingly, a compound of structure (8b) wherein M=Cu and R(5-20)=H is obtainable as Heliogen® Blue K 6911D or Heliogen® Blue K 7104 KW from BASF AG, Ludwigshafen.

Compounds of structure (8a) are obtainable, for example, as Heliogen® Blue L 7460 from BASF AG, Ludwigshafen.

Of the structures (1a) and/or (1b), (2a) and/or (2b) and (3), the use of structures (1a) and/or (1b), (2a) and/or (2b) is particularly preferred. The use of (1a) and/or (1b) is most particularly preferred.

Of the structures (4), (6), (7) and (8a) or (8b), the use of structures (4), (7) and (8b) is particularly preferred, it being possible, as described above, for structure (4) to be replaced by structure (5) under the described conditions. The use of colouring agents of structure (7) is most particularly preferred. In a specific embodiment of the present invention, the sole use of colouring agents of structure (7) is particularly preferred as regards the organic colouring agents according to the invention.

A particularly preferred group of colouring agent combinations does not contain colouring agents of structure (3).

While in an alternative embodiment colouring agent combinations containing at least one colouring agent from each of groups d1) and d2) are preferably used, it is possible, in a departure therefrom, to use colouring agent combinations according to XXI and XXII in a particular embodiment.

In those particularly suitable colouring agent combinations, the colouring agent structures mentioned explicitly as being preferred under components d1) and d2) are preferably used.

In a further preferred embodiment, the colouring agents of structures d1) and the colouring agents of structures d2) are present in a ratio of from 1:3 to 3:1, preferably in a ratio of from 1:2 to 2:1.

The organic colouring agents disclosed as components d1) and d2) within the context of the present invention can be used in thermoplastic polymer compositions in amounts of from 0.000001 wt. % to 1.000000 wt. %, preferably from 0.00005 wt. % to 0.50000 wt. % and particularly preferably from 0.0001 wt. % to 0.1000 wt. %, based on the respective individual component.

If more than one colouring agent is to be used, the choice of the additional colouring agents must be made in such a manner that the limits mentioned hereinbelow in respect of the colour change and the change in the IR performance after weathering are observed.

The indicated amounts in wt. % are based on a resulting polymer composition containing the organic colouring agents or organic colouring agent combinations according to the invention.

In a preferred embodiment, the colouring agent compositions according to the invention consist only of compounds of the above-mentioned structures 1 to 8.

e) optionally from 0.0 wt. % to 0.5 wt. %, preferably from 0.038 wt. % to 0.500 wt. %, more preferably from 0.050 to 0.250 wt. %, particularly preferably from 0.063 to 0.150 wt. %, based on the total weight of the composition, of a further IR absorber, preferably of a further IR absorber based on ITO and/or ATO, particularly preferably based on ATO.

f) optionally from 0.0 wt. % to 1.0 wt. %, preferably from 0.01 wt. % to 0.50 wt. %, particularly preferably from 0.01 wt. % to 0.40 wt. %, of one or more demoulding agents, g) optionally from 0.0 wt. % to 20.0 wt. %, preferably from 0.05 wt. % to 10.00 wt. %, more preferably from 0.10 wt. % to 1.00 wt. %, yet more preferably from 0.10 wt. % to 0.50 wt. %, and most particularly preferably from 0.10 wt. % to 0.30 wt. %, of one or more UV absorbers, h) optionally from 0.00 wt. % to 0.20 wt. %, preferably from 0.01 wt. % to 0.10 wt. %, of one or more heat or processing stabilisers, preferably selected from the group of the phosphines, phosphites and phenolic antioxidants and mixtures thereof. In a specific embodiment of the present invention, from 0.01 wt. % to 0.05 wt. %, preferably from 0.015 wt. % to 0.040 wt. %, of heat or processing stabilisers is used.

i) optionally from 0.0 wt. % to 5 wt. %, preferably from 0.01 wt. % to 1.00 wt. %, of one or more additives.

The indicated amounts are based in each case on the polymer composition as a whole.

The invention further provides a process for the preparation of the compositions according to the invention, and their use and products produced therefrom.

The compositions according to the invention are stable to weathering, the colour values and the solar direct transmittance $T_{DS}$ or the solar total transmittance $T_B$ exhibiting only slight changes.

The colour change ΔE after 3000 hours' artificial weathering with 0.75 W xenon illumination is less than 3.5, preferably less than 3.0, particularly preferably less than 2.5.

The change in the solar direct transmittance $\Delta T_{DS}$ after 3000 hours' artificial weathering with 0.75 W xenon illumination is less than 1.0%, preferably less than 0.9%, particularly preferably less than 0.8%.

In a particular embodiment, the following requirements are to be fulfilled in respect of the colour of a transparent moulded body preferably made of polycarbonate, PMMA, PS, preferably PC:

a*=0±5 and b*=0±5, preferably a*=0±4 and b*=0±4 and particularly preferably a*=0±2 and b*=0±2.

The moulded body is transparent and has an initial haze of less than 3.0%, preferably 2.5%, particularly preferably less than 2.0%.

The light transmission (Ty) must be in the range from 15% to 80%, preferably in the range from 20% to 75%. Accordingly, also included is, inter alia, glazing which must achieve the values in respect of light transmission that are specified for the driver's view.

The $T_{DS}$ value is preferably less than 70%, particularly preferably less than 60% and most particularly preferably less than 55%.

It must be possible to process the composition at the temperatures conventional for thermoplastics, that is to say at temperatures above 300° C., such as, for example, 350° C., without the colour or performance data changing markedly during processing.

Transparent thermoplastic plastics within the scope of the invention are polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copoly-acrylates and poly- or copoly-methacrylate such as, for example, poly- or copoly-methyl methacrylates (such as PMMA) as well as copolymers with styrene such as, for example, transparent polystyrene-acrylonitrile (PSAN), thermoplastic polyurethanes, polymers based on cyclic olefins (e.g. TOPAS®, a commercial product of Ticona).

Mixtures of a plurality of transparent thermoplastic polymers, provided they can be mixed with one another to form a transparent mixture, are also possible, a mixture of polycarbonate with PMMA (more preferably with PMMA<2 wt. %) or polyester being preferred.

A specific embodiment contains in this connection a mixture of polycarbonate and PMMA with less than 2.0%, preferably less than 1.0%, more preferably less than 0.5%, at least 0.01% PMMA being present, based on the amount of polycarbonate, the PMMA preferably having a molar weight <40,000 g/mol. In a particularly preferred embodiment, the content of PMMA is 0.2% and particularly preferably 0.1%, based on the amount of polycarbonate, the PMMA preferably having a molar weight <40,000 g/mol.

A further specific embodiment contains a mixture of PMMA and polycarbonate with less than 2%, preferably less than 1%, more preferably less than 0.5%, yet more preferably with 0.2% and particularly preferably 0.1% polycarbonate, based on the amount of PMMA.

Particularly preferred polycarbonates are the homopolycarbonate based on bisphenol A, the homopolycarbonate based on 1,3-bis-(4-hydroxyphenyl)-3,3,3-trimethylcyclohexane and the copolycarbonates based on the two monomers bisphenol A and 1,1-bis-(4-hydroxyphenyl)-3,3,5-trimethylcyclohexane.

Polycarbonates within the scope of the present invention are both homopolycarbonates and copolycarbonates; the polycarbonates can be linear or branched in known manner.

The polycarbonates are prepared in known manner from diphenols, carbonic acid derivatives, optionally chain terminators and branching agents.

Details of the preparation of polycarbonates have been laid down in many patent specifications for about 40 years. By way of example, reference is made here only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second Edition, 1988, pages 648-718 and finally to Dres. U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

Diphenols suitable for the preparation of the polycarbonates are, for example, hydroquinone, resorcinol, dihydroxydiphenyls, bis-(hydroxyphenyl)-alkanes, bis(hydroxyphenyl)-cycloalkanes, bis-(hydroxyphenyl) sulfides, bis-(hydroxyphenyl)ethers, bis-(hydroxyphenyl) ketones, bis-(hydroxyphenyl)-sulfones, bis-(hydroxyphenyl) sulfoxides, alpha,alpha'-bis-(hydroxyphenyl)-diisopropylbenzenes, pthhalimides derived from isatin or phenolphthalein derivatives, and compounds thereof alkylated and halogenated on the ring.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenye-propane, 1,1-bis-(4-hydroxyphenyl)-cyclohexane and 1,1-bis-(4-hydroxyphenyl)-3,3,5-trimethylcyclohexane.

These and further suitable diphenols are described, for example, in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates, only one diphenol is used; in the case of copolycarbonates, a plurality of diphenols is used.

Suitable carbonic acid derivatives are, for example, phosgene or diphenyl carbonate.

Suitable chain terminators which can be used in the preparation of the polycarbonates are both monophenols and monocarboxylic acids. Suitable monophenols are phenol itself, alkylphenols such as cresols, p-tert-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol, and mixtures thereof.

Preferred chain terminators are phenol, cumylphenol and/or p-tert-butylphenol.

Suitable monocarboxylic acids are also benzoic acid, alkylbenzoic acids and halobenzoic acids.

Preferred chain terminators are also the phenols which are mono- or poly-substituted by C1- to C30-alkyl radicals, linear or branched, preferably unsubstituted or substituted by tert-butyl.

The amount of chain terminator to be used is preferably from 0.1 to 5 mol %, based on moles of diphenols used in a particular case. The addition of the chain terminators can take place before, during or after the phosgenation.

Suitable branching agents are the compounds known in polycarbonate chemistry having a functionality of three or more than three, in particular those having three or more than three phenolic OH groups.

Suitable branching agents are, for example, phloroglucinol, 4,6-dimethyl-2,4,6-tri-(4-hydroxyphenyl)-hept-2-ene, 4,6-dimethyl-2,4,6-tri(4-hydroxyphenyl)-heptane, 1,3,5-tri (4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methyl-benzyl)-4-methylphenol, 2-(4-hydroxyphenyl)-2-(2, 4-dihydroxyphenyl)-propane, hexa-(4(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally to be used is preferably from 0.05 mol % to 2.00 mol %, again based on moles of diphenols used in a particular case.

The branching agents can either be placed in the aqueous alkaline phase with the diphenols and the chain terminators or they can be dissolved in an organic solvent and added before the phosgenation. In the case of the transesterification process, the branching agents are used together with the diphenols.

The aromatic polycarbonates of the present invention have weight-average molecular weights Mw (determined by gel permeation chromatography and calibration with polycarbonate calibration) of from 5000 to 200,000, preferably from 10,000 to 80,000 and particularly preferably from 15,000 to 40,000.

The polymer compositions according to the invention can optionally contain, in addition to the components according to the invention, also further conventional polymer additives, such as, for example, the flameproofing agents, optical brightening agents or flow improvers described in EP-A 0 839 623, WO-A 96/15102, EP-A 0 500 496 or "Plastics Additives Handbook", Hans Zweifel, 5th Edition 2000, Hanser Verlag Munich, in the amounts conventional for the thermoplastics in question.

The further polymer additives are preferably used in amounts of from 0.0 wt. % to 5.0 wt. %, more preferably from 0.01 wt. % to 1.00 wt. %, in each case based on the amount of the total polymer compositions. Mixtures of a plurality of additives are also suitable.

The nano-scale boride-based inorganic IR absorber particles provided by the present application are preferably a metal boride, the metal being selected from the group comprising La, Ce, Pr, Nd, Tb, Dy, Ho, Y, Sm, Eu, ER, Tm, Yb, Lu, Sr, Ti, Zr, Hf, V, Ta, Cr, Mo, W and Ca. The hexaboride form is particularly preferred. Particular preference is given to lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride (CrB and $CrB_2$), molybdenum boride ($MoB_2$, $Mo_2B_5$ and MoB), tungsten boride ($W_2B_5$), or combinations of these borides. Most particular preference is given to borides based on lanthanum hexaboride ($LaB_6$) or mixtures containing lanthanum hexaboride.

The surface of these particles is preferably unoxidised; however, oxidised or partially oxidised particles can be used.

In a particular embodiment of the present invention, the sole use of lanthanum hexaboride ($LaB_6$) is most particularly preferred.

The boride-based IR absorbers can be prepared, for example, from oxides of the rare earths, such as, for example, $X_2O_3$ (where X e.g.=La, Ce, Pr, Nd, Gd) and, for example, boron carbides ($B_4C$) by mixing those compounds and tempering the mixture for several hours, such as, for example, 3 hours, in vacuo at high temperatures, such as, for example 1500° C. The boride is obtained in the form of a powder. There is no limitation regarding the form of the finely divided particles—for example, the particles can have a spherical, platelet-like, irregular or needle-like form. The absorbing power for IR radiation is greater, the more crystalline the boride particles. However, even particles having low crystallinity (e.g. characterised by a broad diffraction peak in the X-ray diffraction experiment) have an adequate IR-absorbing property within the scope of the invention. However, that is only the case as long as the particles have on the inside a bond of the metal used and boron. The colour of the particles in the powder can be, for example, greyish-black, brownish-black, greenish-black or the like.

The average size of the particles (determined by TEM/transmission electron microscopy) is preferably smaller than 200 nm, particularly preferably smaller than or equal to 150 nm and most particularly preferably smaller than 100 nm, the mean particle diameters preferably being in the range from 1 nm to 100 nm, more preferably in the range from 2 nm to 80 nm.

Tungstates that are used have an amorphous, a cubic, tetragonal or hexagonal tungsten-bronze structure. The preparation of doped tungstates is described in WO2005037932. In particular, tungstates doped with zinc oxide, as described in Italian patent applications RM2010A000227 and RM2010A000228, can be used as IR absorbers.

For the preparation of such materials, tungsten trioxide, tungsten dioxide, a hydrate of a tungsten oxide, tungsten hexachloride, ammonium tungstate or tungstic acid, for example, and optionally further salts containing the element M, such as, for example, caesium carbonate, are mixed in specific stoichiometric ratios, so that the molar ratios of the individual components are given by the formula $M_xW_yO_z$. This mixture is then treated at temperatures of from 100° C. to 850° C. in a reducing atmosphere, for example an argon-hydrogen atmosphere, and finally the resulting powder is tempered at temperatures of from 550° C. to 1200° C. under an inert gas atmosphere.

There are no limitations regarding the size distribution of the particles. Accordingly, bi- or higher-modal distributions can also be present. The particles are transparent in the visible range of the spectrum, transparent meaning that the absorption of the IR absorbers in the visible range is low compared with the absorption in the IR range and the IR absorber does not lead to markedly increased haze of the composition or the end product in question. This means that, in the composition as a whole, the transparent moulded body has a light transmission of at least 15% and a haze of less than 3%, preferably less than 2.5%, more preferably less than 2.0%.

The size of the particles can be determined, for example, by means of transmission electron microscopy (TEM). Such measurements on IR absorber nanoparticles are described, for example, in Adachi et al., J. Am. Ceram. Soc. 2008, 91, 2897-2902.

The surface of the particles can be treated. For example, the surface can be treated with a silane or provided with a titanium-based, zirconium-based layer or similar layers. The resistance to moisture can be increased by means of this treatment. This type of coating increases the long-term stability in respect of the IR absorption and is described, for example, in US 2005 0161642.

In addition to the boride- or tungstate-based particles, further particles based on $SiO_2$, $TiO_2$, $ZrO_2$, $Al_2O_3$ or MgO can—but do not necessarily have to be—present. These particles are preferably present in a size of less than 200 nm.

In the present invention, the finely divided IR absorber particles are introduced into the polymer matrix in the form of a dispersion. This dispersion prevents reagglomeration and facilitates incorporation into a thermoplastic matrix such as, for example, polycarbonate. Polymer-like dispersing agents are preferably used. Suitable polymer-based dispersing agents are especially dispersing agents which have high light transmission, such as, for example, polyacrylates, polyethers, polyesters or polyurethanes and polymers derived therefrom. Preferred as dispersing agents are polyacrylates, polyethers and polyester-based polymers. Dispersing agents having high temperature stability are preferably used. In a preferred embodiment, the IR absorber is present in a powder dispersion.

The amount of inorganic IR absorber in the dispersion is preferably from 0.1 wt. % to 50.0 wt. %, preferably from 1.0 wt. % to 40.0 wt. % and most particularly preferably from 5.0 wt. % to 30.0 wt. %, based on the sum of the mass of dispersing agent and inorganic IR absorber. In order to prepare the inorganic IR absorber nanoparticles according to the invention, the IR absorber can be mixed with the dispersing agents described hereinbelow and further organic solvents, such as, for example, toluene, benzene or similar aromatic hydrocarbons, and ground in suitable mills, such as, for example, ball mills, with the addition of zirconium oxide (e.g. having a diameter of 0.3 mm) in order to prepare the desired particle size distribution. The nanoparticles are obtained in the form of a dispersion. After grinding, further dispersing agents can optionally be added. The solvent is removed at elevated temperatures and reduced pressure.

The preparation of dispersions of inorganic IR absorbers is described, for example, in JP2003-277045, DE 10392543 and in Adachi et al., J. Am. Chem. Ceram. Soc. 2008, 91[9], 2897-2902. Lanthanum hexaboride in the form of the dispersion, which is suitable within the scope of the invention, is obtainable commercially from, for example, Sumitomo Metal Mining Co., Ltd., for example under the trade name KHDS 06.

Caesium tungstate in the form of the dispersion, which is suitable within the scope of the invention, is obtainable commercially from, for example, Sumitomo Metal Mining Co., Ltd., for example under the trade name YMDS 874.

Dispersing agents suitable for the present invention are obtainable commercially. Polyacrylate-based dispersing agents are particularly suitable. Polyacrylates are obtainable, for example, from Ciba Specialty Chemicals under the trade names EFKA®, for example EFKA® 4500 and EFKA® 4530. Polyester-based dispersing agents are likewise suitable. Polyester-containing dispersing agents are obtainable from Avecia under the trade names Solsperse®, for example Solsperse® 22000, 24000SC, 26000, 27000. Polyurethane-based systems are also suitable. These are obtainable from Ciba Specialty Chemicals under the trade names EFKA® 4046, EFKA® 4047. Texaphor® P60 and P63 are corresponding trade names of Cognis. Polyether-containing dispersing agents can likewise be used. These are known, for example, under the trade names Disparlon® DA234 and DA325 of Kusumoto Chemicals.

The dispersing agents can be used on their own or in combinations. With regard to the thermal stability, dispersing agents from the group of the polyacrylates and polyesters are particularly preferred.

The IR-absorbing inorganic IR absorbers are preferably dispersed in an organic matrix.

In a preferred embodiment, the inorganic IR absorbers are in the form of a ready-to-use dispersion of a mixture of polymethyl methacrylate and polyester in a solids content of from 5 wt. % to 25 wt. %. Organic solvents such as toluene and further inorganic particles such as zirconium dioxide can additionally be present.

In a further embodiment it is possible additionally to use further IR absorbers in addition to the borides or tungstates according to the invention as IR absorbers, which further IR absorbers are preferably from the group of the tin oxides, more preferably antimony-doped tin oxide (ATO) or indium tin oxide (ITO), particularly preferably ATO.

In a further preferred embodiment, the additional IR absorber(s) has(have) an absorption spectrum different from that of the boride or tungstate used based on the absorption maxima, so that a maximum absorption range is covered by the maxima.

The polymer composition optionally contains an inorganic pigment, preferably carbon black. The carbon black is preferably present in finely dispersed form in the organic polymer matrix and is preferably nano-scale. Suitable carbon blacks have an average particle size of preferably less than 100 nanometers (nm), more preferably less than 75 nm, yet more preferably less than 50 nm and particularly preferably less than 40 nm, the average particle size preferably being greater than 0.5 nm, more preferably greater than 1 nm and particularly preferably greater than 5 nm.

Carbon blacks suitable within the scope of the invention differ from so-called conductive blacks in that they have only low or no electrical conductivity. Compared with the carbon blacks used here, conductive blacks have specific morphologies and superlattices in order to achieve high conductivity. By contrast, the nano-scale carbon blacks used here can very readily be dispersed in thermoplastics so that virtually no cohesive regions of carbon black occur, from which a corresponding conductivity might result. Suitable carbon blacks within the scope of the invention which are obtainable commercially are obtainable under a large number of trade names and in a large number of forms, such as pellets or powder. For example, suitable carbon blacks are obtainable under the trade names BLACK PEARLS®, in the form of wet-processed pellets under the names ELFTEX®, REGAL® and CSX®, and in a flocculent form under the names MONARCH®, ELFTEX®, REGAL® and MOGUL®—all obtainable from Cabot Corporation.

In a particularly preferred embodiment, the carbon black types have particle sizes of from 10 nm to 30 nm and have a surface area of preferably from 35 $m^2$ to 138 $m^2$ per g ($m^2$/g). The carbon black can be treated or untreated—for example, the carbon black can be treated with specific gases, with silica or organic substances, such as, for example, butyllithium. Such treatment allows the surface to be modified or functionalised. This can promote compatibility with the correspondingly used matrix. Particular preference is given to carbon blacks marketed under the trade name BLACK PEARLS® (CAS No. 1333-86-4).

The concentrations indicated herein for carbon blacks and IR absorbers are preferably used for finished parts having thicknesses of from 2 mm to 8 mm, preferably from 3.5 to 7.0 mm and particularly preferably from 4 mm to 6 mm. In the case of a smaller or larger thickness, the concentrations must be increased or reduced accordingly in order to avoid, for example, too great a haze or too low an effect.

In a particular embodiment in which, for example, high torsional stiffness is required—for example in the case of aircraft/railway vehicles—thicknesses of from 8 mm to 20 mm can be required. The concentrations of the IR absorbers and of the inorganic nano-scale pigment must be adapted accordingly in this case, that is to say the concentration falls as the layer thickness increases.

In a particular embodiment, the polymer composition contains heat stabilisers. Particularly suitable are phosphites and phosphonites as well as phosphines. Examples are triphenyl phosphite, diphenylalkyl phosphite, phenyldialkyl phosphite, tris(nonylphenyl)phosphite, trilauryl phosphite, trioctadecyl phosphite, distearylpentaerythritol diphosphite, tris(2,4-di-test-butylphenyl)phosphite, diisodecylpentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearylsorbitoltriphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocine, 2,2',2"-nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bis-diphenylphosphino-ethane or a trinaphthylphosphine. Particular preference is given to the use of triphenylphosphine (TPP), Irgafos® 168 (tris(2,4-di-tert-butyl-phenyl) phosphite) and tris(nonylphenyl) phosphite or mixtures thereof.

Phenolic antioxidants such as alkylated monophenols, alkylated thioalkylphenols, hydroquinones and alkylated hydroquinones can also be used. Irganox® 1010 (pentaerythritol 3-(4-hydroxy-3,5-di-tert-butylphenyl)propionate; CAS: 6683-19-8) and Irganox® 1076 (2,6-di-tert-butyl-4-(octadecanoxycarbonylethyl)phenol) are preferably used.

In a specific embodiment of the present invention, the phosphine compounds according to the invention are used together with a phosphite or a phenolic antioxidant or a mixture of the two last-mentioned compounds.

If a tungstate is used under point b) as inorganic IR absorber, the use of a specific stabiliser can be found to be useful. In a particular embodiment, the composition contains at least one phosphine-based stabiliser, but preferably a mixture of at least one phosphine-based stabiliser, at least one phosphite-based stabiliser and at least one stabiliser from the group of the phenolic antioxidants.

Phosphines within the scope of the present invention are derived from compounds of the general type $P_nP_{n+2}$, in particular from $PH_3$, wherein preferably all the hydrogen atoms have been replaced by aliphatic and/or aromatic hydrocarbon radicals, wherein the aromatic hydrocarbon radicals can contain further substituents such as, for example, alkyl groups. The phosphines can contain one phosphorus atom or a plurality of phosphorus atoms bridged via corresponding aliphatic and/or aromatic hydrocarbons.

Phosphites within the scope of the present invention are to be understood as being esters of phosphonic acid (often also referred to as phosphorous acid esters) having the general structure $P(OR)_3$, wherein R represents aliphatic and/or aromatic hydrocarbon radicals, wherein the aromatic hydrocarbon radicals can contain further substituents such as, for example, alkyl groups.

Phosphonates are to be understood as being compounds derived from the basic structure R—$PO(OH)_2$, wherein R represents aliphatic and/or aromatic hydrocarbon radicals, wherein the aromatic hydrocarbon radicals can contain further substituents such as, for example, alkyl groups. The OH groups of the basic structure can be partially or completely esterified to OR functionalities, wherein R again represents aliphatic and/or aromatic hydrocarbon radicals, wherein the aromatic hydrocarbon radicals can contain further substituents such as, for example, alkyl groups, or can be partially or completely deprotonated, the negative overall charge being balanced by a corresponding counter-ion.

Phosphonites within the scope of the present invention are to be understood as being esters, in particular diesters, of phosphonous acid of the type R—$P(OR)_2$, wherein R represents aliphatic and/or aromatic hydrocarbon radicals, wherein the aromatic hydrocarbon radicals can contain further substituents such as, for example, alkyl groups. The phosphonites can contain one phosphorus atom or a plurality of phosphorus atoms bridged via corresponding aliphatic and/or aromatic hydrocarbons.

Within the context of the present invention, phosphates are to be understood as being salts, partial or full esters and condensation products of phosphoric acid ($H_3PO_4$).

There are no limitations regarding the choice of phosphines, the phosphine compounds preferably being selected from the group comprising aliphatic phosphines, aromatic phosphines and aliphatic-aromatic phosphines.

The phosphine compounds can be primary, secondary and tertiary phosphines. Preference is given to the use of tertiary phosphines, aromatic phosphines being particularly preferred and tertiary aromatic phosphines being most particularly preferred.

In a preferred embodiment of the present invention there are used triphenylphosphine (TPP), trialkylphenylphosphine, bisdiphenylphosphino-ethane or a trinaphthylphosphine, of which triphenylphosphine (TPP) is most particularly preferred, or mixtures of those phosphines.

Mixtures of different phosphines can in principle be used.

In an embodiment, the IR absorber according to the invention is mixed with the stabiliser combination according to the invention before being incorporated into the thermoplastic polymer matrix.

The preparation and properties of phosphine compounds are known to the person skilled in the art and are described, for example, in EP-A 0 718 354 and "Ullmanns Enzyklopädie der Technischen Chemie", 4th Ed., Vol. 18, p. 378-398 and Kirk-Othmer, 3rd Ed., Vol. 17, p. 527-534.

With regard to the amount of the phosphine compound to be used in the stabiliser mixture, it must be taken into account that, under certain processing conditions, depending on the temperature and the residence time, the substance is oxidised. The oxidised portion is no longer available for stabilising the IR absorbers used. Therefore, the number of processing steps and the process conditions are to be taken into account. After thermal processing, the composition accordingly also always contains specific amounts of oxidised phosphine, particularly preferably triphenylphosphine oxide.

Suitable commercially obtainable phosphite stabilisers within the context of the present invention are, for example, Irgafos® 168 (tris(2,4-di-tert-butyl-phenyl) phosphite/CAS No. 31570-04-4), Irgafos® TPP (CAS No. 101-02-0) and Irgafos® TNPP (CAS No. 26523-78-4), Irgafos® 168 being particularly preferred.

Suitable commercially available phenolic antioxidants are, for example, Irganox® 1076 (CAS No. 2082-79-3/2,6-di-tert-butyl-4-(octadecanoxycarbonylethyl)phenol) and Irganox® 1010 (CAS No. 6683-19-8).

In a preferred embodiment, the stabiliser combination consists of triphenylphosphine as well as Irgafos 168® and Irganox 1076®.

Irganox® 1010 (pentaerythritol 3-(4-hydroxy-3,5-di-tert-butylphenyl)propionate; CAS No.: 6683-19-8) can be used as an alternative to Irganox 1076®.

The amount of the optional stabiliser combination when using tungstates in the composition as a whole is from 0.001 wt. % to 0.500 wt. %, preferably from 0.005 wt. % to 0.250 wt. %, more preferably from 0.01 wt. % to 0.15 wt. % and particularly preferably from 0.015 wt. % to 0.125 wt. %, based on the total weight of the composition.

In a preferred embodiment, the polymer composition according to the invention further contains an ultraviolet absorber. Ultraviolet absorbers suitable for use in the polymer composition according to the invention are compounds that have as low a transmission as possible below 400 nm and as high a transmission as possible above 400 nm. Such compounds and their preparation are known in the literature and are described, for example, in EP-A 0 839 623, WO-A 96/15102 and EP-A 0 500 496. Particularly suitable ultraviolet absorbers for use in the composition according to the invention are benzotriazoles, triazines, benzophenones and/or arylated cyanoacrylates.

Particularly suitable ultraviolet absorbers are hydroxybenzotriazoles, such as 2-(3',5'-bis-(1,1-dimethylbenzyl)-2'-hydroxy-phenyl)-benzotriazole (Tinuvin® 234, Ciba Spezialitätenchemie, Basel), 2-(2'-hydroxy-5'-(tert-octyl)-phenyl)-benzotriazole (Tinuvin® 329, Ciba Spezialitätenchemie, Basel), 2-(2'-hydroxy-3'-(2-butyl)-5'-(tert-butyl)-phenyl)-benzotriazole (Tinuvin® 350, Ciba Spezialitätenchemie, Basel), bis-(3-(2H-benztriazolyl)-2-hydroxy-5-tert-octyl)methane (Tinuvin® 360, Ciba Spezialitätenchemie, Basel), (2-(4,6-diphenyl-1,3,5-triazin-2-yl)-5-(hexyloxy)-phenol (Tinuvin® 1577, Ciba Spezialitätenchemie, Basel), as well as the benzophenones 2,4-dihydroxy-benzophenone (Chimasorb® 22, Ciba Spezialitätenchemie, Basel) and 2-hydroxy-4-(octyloxy)-benzophenone (Chimassorb® 81, Ciba, Basel), 2-propenoic acid, 2-cyano-3,3-diphenyl-2,2-bis[[(2-cyano-1-oxo-3,3-diphenyl-2-propenyl)oxy]-methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basel) or tetra-ethyl-2,2'-(1,4-phenylene-dimethylidene)-bismalonate (Hostavin® B-Cap, Clariant AG).

Mixtures of these ultraviolet absorbers can also be used.

There are no particular limitations regarding the amount of ultraviolet absorber contained in the composition, as long as the desired absorption of UV radiation and adequate transparency of the moulded body produced from the composition are ensured.

The polymer compositions according to the invention can optionally contain demoulding agents. Particularly suitable demoulding agents for the composition according to the invention are pentaerythritol tetrastearate (PETS) or glycerol monostearate (GMS).

Methods for the preparation of the polymer compositions according to the invention are known to the person skilled in the art.

The preparation of the polymer compositions according to the invention containing components a) to i) is carried out by conventional incorporation processes by combining, mixing and homogenising the individual constituents, the homogenisation in particular preferably being carried out in the melt under the action of shear forces. Combining and mixing prior to melt homogenisation are optionally carried out using powder premixtures.

It is also possible to use premixtures which have been prepared from solutions of the mixture components in suitable solvents, homogenisation optionally being carried out in solution and the solvent subsequently being removed.

In particular, the components of the composition according to the invention can be introduced by known methods or in the form of a masterbatch.

The use of masterbatches and of powder mixtures or compacted premixtures is particularly suitable in particular for the introduction of components b) up to and including i).

Particularly preferably, components b), c) and d) are incorporated in the form of a powder mixture, the powder mixture additionally containing pulverulent component a), or in the form of a compacted mixture of components b), c) and d), optionally additionally containing component a), or in the form of a masterbatch of components a), b), c) and d).

In a particular embodiment, the above-mentioned components can be mixed to form a masterbatch, mixing preferably taking place in the melt under the action of shear forces (for example in a kneader or twin-screw extruder). This process offers the advantage that the components are better distributed in the polymer matrix. For the preparation of the masterbatch, the thermoplastic plastic, which also represents the main component of the final polymer composition as a whole, is preferably chosen as the polymer matrix.

In this connection, the composition can be combined, mixed, homogenised and then extruded in conventional devices such as screw-type extruders (for example twin-screw extruder, ZSK), kneaders, Brabender or Banbury mills. After the extrusion, the extrudate can be cooled and comminuted. It is also possible for individual components to be premixed and the remaining starting materials subsequently to be added separately and/or likewise as a mixture.

The polymer compositions according to the invention can be processed to products or moulded bodies by, for example, first extruding the polymer compositions as described to form a granulate and processing the granulate by suitable processes into various products or moulded bodies in known manner.

In this connection, the compositions according to the invention can be converted, for example, by means of hot pressing, spinning, blow moulding, deep drawing, extrusion or injection moulding into products or moulded bodies, moulded objects such as parts for toys, fibres, films, tapes, sheets such as solid sheets, multi-wall sheets, twin-wall sheets or corrugated sheets, containers, pipes or other profiles. The use of multi-layer systems is also of interest. Application can take place at the same time as or immediately after moulding of the base body, for example by coextrusion or multi-component injection moulding. However, application can also be to the finished moulded base body, for example by lamination with a film or by coating with a solution.

Sheets of a base layer and optional top layer/layers (multi-layer systems) can be produced by (co)extrusion, direct skinning, direct coating, insert moulding, film insert moulding, or other suitable processes known to the person skilled in the art.

For extrusion, the polymer composition, which has optionally been pretreated, for example by means of drying, is fed to the extruder and melted in the plastification system of the extruder. The plastics melt is then pressed through a flat die or multi-wall sheet die and thereby shaped, is brought to the desired final form in the roll gap of a smoothing calendar, and its shape is fixed by alternate cooling on smoothing rollers and with ambient air. The temperatures necessary for extrusion of the polymer composition are set, it usually being possible to follow the manufacturer's instructions. If the polymer compositions contain, for example, polycarbonates having a high melt viscosity, they are normally processed at melt temperatures of from 260° C. to 350° C., and the cylinder temperatures of the plastification cylinder and the die temperatures are set accordingly.

By using one or more side extruders and a multiple manifold die or optionally suitable melt adapters upstream of a flat die it is possible to lay thermoplastic melts of different compositions above one another and accordingly produce multi-layer sheets or films (for coextrusion see, for example, EP-A 0 110 221, EP-A 0 110 238 and EP-A 0 716 919, for details of the adapter and die process see Johannaber/Ast: "Kunststoff-Maschinenführer", Hanser Verlag, 2000 and Gesellschaft Kunststofftechnik: "Coextrudierte Folien und Platten: Zukunftsperspektiven, Anforderungen, Anlagen und Herstellung, Qualitätssicherung", VDI-Verlag, 1990).

Using the above-described thermoplastic substrates, moulded bodies can also be produced by injection moulding. The processes therefor are known and are described in "Handbuch Spritzgiessen", Friedrich Johannaber/Walter Michaeli, Munich; Vienna: Hanser, 2001, ISBN 3-446-15632-1 or "Anleitung zum Bau von Spritzgiesswerkzeugen", Menges/Michaeli/Mohren, Munich; Vienna: Hanser, 1999, ISBN 3-446-21258-2.

Injection moulding is a forming process which is used in plastics processing.

By means of this process it is possible to produce, in an economical manner, large numbers of mouldings which can be used directly. To that end, using an injection-moulding machine, the material in question, or the moulding composition, is plasticised in an injection unit and injected into an injection-moulding tool. The hollow space, the cavity, of the tool determines the shape and surface structure of the finished component.

Injection moulding here includes all injection-moulding processes including multi-component injection moulding and injection-compression processes.

For the production of plastics mouldings, the injection moulding and injection-compression variants known in plastics processing are used. Conventional injection-moulding processes without injection-compression technology are used in particular for the production of smaller injection-moulded parts in which short flow paths occur and it is possible to work with moderate injection pressures. In the conventional injection-moulding process, the plastics mass is injected into a cavity formed between two closed moulding plates which are in a fixed position, where it solidifies.

Injection-compression processes differ from conventional injection-moulding processes in that the injection and/or solidification operation is carried out with the execution of a moulding plate movement. In the known injection-compression process, the moulding plates are already open slightly before the injection operation in order to compensate for the shrinkage that occurs during subsequent solidification and reduce the necessary injection pressure. A pre-enlarged cavity is therefore already present at the beginning of the injection operation. Shearing edges of the tool ensure that the pre-enlarged cavity is sufficiently tight even with the moulding plates slightly open. The plastics mass is injected into the pre-enlarged cavity and, during or after the injection, is compressed in the closing direction with the execution of a tool movement. In particular in the production of large and thin-walled mouldings with long flow paths, the more complex injection-compression technique is preferred or optionally absolutely necessary. Only in that manner is a reduction in the injection pressures required in the case of large mouldings achieved. Furthermore, stresses or distortion in the injection-moulded part, which occur as a result of high injection pressures, can be avoided by injection-compression. This is important in particular in the case of the production of optical plastics applications, such as, for example, glazing (windows) in motor vehicles, because increased demands are to be observed in terms of freedom from stresses in the case of optical plastics applications.

Preferred products, moulded bodies or shaped objects according to the invention are sheets, films, pipes, glazing, for example car windows, windows of railway vehicles and aircraft, car sunroofs, safety glazing, roof coverings or glazing for buildings, lamp covers for the interior of vehicles and buildings, lamp covers for the exterior sector, such as, for example, covers for streetlamps, visors, spectacles, extruded and solution films for displays or electronic motors, also ski foils, traffic light housings, traffic light covers, traffic light lenses, which contain the compositions according to the invention. In addition to solid sheets, it is also possible to use twin-wall sheets or multi-wall sheets. In addition to the compositions according to the invention, further material components, for example, can be present in the products according to the invention as further components of the products according to the invention. For example, glazing can have sealing materials at the edges of the panels. Roof coverings can have, for example, metal components such as screws, metal pins or the like, which can be used to secure or guide (in the case of folding or sliding roofs) the roofing elements. Further materials can also be joined to the compositions according to the invention, for example by 2-component injection moulding. For example, the corresponding structural element having IR-absorbing properties can be provided with an edge which is used, for example, for adhesive bonding.

In a particular embodiment, the articles produced from the composition of the present invention are coated. This coating serves to protect the thermoplastic material against general weathering influences (e.g. damage by sunlight) as well as against mechanical damage to the surface (e.g. scratching) and accordingly increases the resistance of the correspondingly equipped articles.

It is known that polycarbonate can be protected against UV radiation by means of various coatings. Such coatings conventionally contain UV absorbers. Such layers likewise increase the scratch resistance of the corresponding article. The articles of the present invention can carry single-layer or multi-layer systems. They can be coated on one side or on both sides. In a preferred embodiment, the article contains a scratch-resistant lacquer containing UV absorber. In a particular embodiment, the multi-layer product contains at least one layer containing the composition according to the invention, at least one anti-UV layer and optionally a scratch-resistant coating.

In the case of glazing materials, the article carries at least one scratch-resistant or anti-reflection coating on at least one side.

The preparation of the coating, for example an anti-reflection coating, can be carried out by various methods. For example, coating can be carried out by various methods of vapour deposition, for example by electron beam processes, resistance heating and by plasma deposition or various sputtering methods such as high-frequency sputtering, magnetron sputtering, ion beam sputtering, etc., ion plating by means of DC, RF, HCD methods, reactive ion plating, etc. or chemical gas-phase deposition. An anti-reflection coating can also be applied from solution. Accordingly, a corresponding coating solution can be prepared via a dispersion of a metal oxide having a high refractive index, such as $ZrO_2$, $TiO_2$, $Sb_2O_5$ or $WO_3$, in a silicon-based lacquer, which coating solution is suitable for the coating of plastics articles and can be cured thermally or with UV assistance.

Various methods are known for producing a scratch-resistant coating on plastics articles. For example, lacquers based on epoxy, acrylic, polysiloxane, colloidal silica gel or inorganic/organic materials (hybrid systems) can be used. Such systems can be applied, for example, by dipping processes, spin coating, spraying processes or flow coating. Curing can be carried out thermally or by means of UV radiation. Single- or multi-layer systems can be used. The scratch-resistant coating can be applied, for example, directly or after preparation of the substrate surface with a primer. Furthermore, a scratch-resistant coating can be applied by plasma-assisted polymerisation processes, for example via an $SiO_2$ plasma.

Anti-fog or anti-reflection coatings can likewise be produced by plasma processes. It is further possible to apply a scratch-resistant coating to the resulting moulded body by means of specific injection-moulding processes, such as, for example, the back-injection of surface-treated films. Various additives, such as, for example, UV absorbers derived, for example, from triazoles or triazines, can be present in the scratch-resistant coating. IR absorbers of organic or inorganic nature can also be present. Such additives can be contained in the scratch-resistant lacquer itself or in the primer layer. The thickness of the scratch-resistant layer is from 1 to 20 μm, preferably from 2 to 15 μm. Below 1 μm, the resistance of the scratch-resistant layer is unsatisfactory. Above 20 μm, cracks occur more frequently in the lacquer. The base material according to the invention, which is described in the present invention, is preferably provided with an above-described scratch-resistant and/or anti-reflection layer after the injection-moulded article has been produced, because the preferred field of use is in the window or automotive glazing sector.

For polycarbonates, a primer containing UV absorber is preferably used in order to improve the adhesion of the scratch-resistant lacquer. The primer can contain further stabilisers such as, for example, HALS systems (stabilisers based on sterically hindered amines), adhesion promoters, flow improvers. The resin in question can be selected from a large number of materials and is described, for example, in Ullmann's Encyclopedia of Industrial Chemistry, 5th Edition, Vol. A18, pp. 368-426, VCH, Weinheim 1991. Polyacrylates, polyurethanes, phenol-based, melamine-based, epoxy and alkyd systems, or mixtures of these systems, can be used. The resin is in most cases dissolved in suitable solvents—frequently in alcohols. Depending on the chosen resin, curing can take place at room temperature or at elevated temperatures. Temperatures of from 50° C. to 130° C. are preferably used—frequently after a large proportion of the solvent has briefly been removed at room temperature. Commercially obtainable systems are, for example, SHP470, SHP470FT and SHP401 from Momentive Performance Materials. Such coatings are described, for example, in U.S. Pat. No. 6,350,512 B1, U.S. Pat. No. 5,869,185, EP 1308084, WO 2006/108520.

Scratch-resistant lacquers (hard-coat) are preferably composed of siloxanes and preferably contain UV absorbers. They are preferably applied by dipping or flow processes. Curing takes place at temperatures of from 50° C. to 130° C. Commercially obtainable systems are, for example, AS4000, SHC5020 and AS4700 from Momentive Performance Materials. Such systems are described, for example, in U.S. Pat. No. 5,041,313, DE 3,121,385, U.S. Pat. No. 5,391,795, WO 2008/109072. The synthesis of these materials is in most cases carried out by condensation of alkoxy- and/or alkylalkoxy-silanes with acid or base catalysis. Nanoparticles can optionally be incorporated. Preferred solvents are alcohols such as butanol, isopropanol, methanol, ethanol and mixtures thereof.

Instead of primer/scratch-resistant coating combinations, one-component hybrid systems can be used. These are described, for example, in EP0570165 or WO 2008/071363 or DE 2,804,283. Commercially obtainable hybrid systems are obtainable, for example, under the names PHC587 or UVHC 3000 from Momentive Performance Materials.

In a particularly preferred process, application of the lacquer takes place by the flooding method, because it results in coated parts of high optical quality.

The flooding method can be carried out manually using a hose or suitable coating head, or automatically in a continuous process using flood-coating robot and optionally sheet dies.

For coating, the structural elements can either be suspended or mounted in an appropriate product carrier.

In the case of larger and/or 3D structural elements, the part to be coated is suspended or placed in a suitable product carrier.

In the case of small parts, coating can also be carried out by hand. The liquid primer or lacquer solution to be applied is poured over the sheet in the longitudinal direction starting from the upper edge of the small part, while the starting point of the lacquer on the sheet is at the same time guided from left to right over the width of the sheet. The lacquered sheets are exposed to the air and cured according to the manufacturer's instructions while being suspended vertically from a clamp.

The polymer compositions according to the invention which absorb infrared radiation (IR) can be used particularly preferably in glazing modules for motor vehicles, railway vehicles and aircraft. Preference is given to glazing modules containing: a base layer containing the polymer compositions according to the invention which absorb infrared radiation (IR), a frame element applied to the base layer, and a rubber-like buffer layer, which is applied to the frame element.

The base layer can be provided with a lacquer system, for example for increasing the scratch resistance. It can further be advantageous to provide the frame element with a primer in order to promote adhesion between the frame element and the rubber-like buffer layer, before the buffer layer is applied.

In order to avoid stresses in the structural element, it must be ensured that the thermal expansion coefficients of the base layer and the frame element are matched to one another by a suitable choice of materials. It has been found to be advantageous in this respect to choose a material for the frame element whose linear thermal expansion coefficient in the longitudinal direction (i.e. when viewed from the sprue in the direction of the melt flow, abbreviated to RS hereinbelow) is from $1\times10^{-5}$ to $3\times10^{-5}$ (mm/mm K) lower than that of the material of the base layer. In addition, the RS/QS ratio of the linear thermal expansion coefficient of the material in question should be in the range from 0.6 to 1.0, QS meaning the transverse direction, i.e. the direction orthogonal to the direction of the melt flow viewed from the sprue.

Preferred materials for the frame element are blends of polycarbonate and polyesters. Of the polyesters, polyalkylene terephthalates are preferred. Of the polyalkylene terephthalates, polybutylene terephthalate (PBT) and polyethylene terephthalate (PET) are preferred, PET being particularly preferred. In order to adjust the linear thermal expansion coefficient, the material for the frame element contains filling and reinforcing materials, it being possible for the filling and reinforcing materials to be, inter alia, in fibre, platelet, tube, rod or bead form or to be spherical or particulate. Suitable filling and reinforcing materials include, for example, talcum, wollastonite, mica, kaolin, kieselguhr, calcium sulfate, calcium carbonate, barium sulfate, glass fibres, glass or ceramics beads, hollow glass beads or hollow ceramics beads, glass or mineral wool, carbon fibres or carbon nanotubes.

Suitable materials for the rubber-like buffer layer are, for example, one-component or two-component polyurethane adhesives. Suitable materials and the requirements made thereof are described, for example, in "Finite Elemente Berechnungen von Structural Glazing Elementen im Bauwesen and geklebten Frontscheiben im Automobilbau" (Boger/Schmoller, 2003) or in EP 0 481 319 A2 and literature cited therein.

EXAMPLES

The invention is described in greater detail hereinbelow by means of exemplary embodiments, the determination methods described herein being used for all corresponding parameters in the present invention unless indicated otherwise.

The melt volume rate (MVR) is determined in accordance with ISO 1133 (at 300° C.; 1.2 kg).

Determination of the colour in transmission is carried out using a Lambda 900 spectral photometer from Perkin Elmer with a photometer cone according to ASTM E1348, using the weighting factors and formulae described in ASTM E308.

Calculation of the CIELAB colour coordinates L*, a*, b* is carried out for illuminant D 65 and a 10° normal observer.

Light Transmission (Ty):

The transmission measurements were carried out on a Lambda 900 spectral photometer from Perkin Elmer with a photometer cone according to ISO 13468-2 (i.e. determination of the total transmission by measuring the diffuse transmission and direct transmission).

Determination of the $T_{DS}$ Value (Solar Direct Transmittance):

The transmission and reflection measurements were carried out on a Lambda 900 spectral photometer from Perkin Elmer with a photometer cone. All the values were determined at wavelengths of from 320 nm up to and including 2300 nm with $\Delta\lambda$ 5 nm.

Calculation of the solar direct transmittance $T_{DS}$ was carried out according to ISO 13837, computational convention "A".

Colour Change:

$\Delta E$ is a calculated value for the perceived colour difference according to ASTM D 2244. In the present tests, illuminant D 65/10° was used. For the calculation of the $\Delta E$ value, formula 7 in ASTM D 2244 was used.

Haze:

The haze was determined according to ASTM D 1003 using a BYK Gardner Haze Gard.

Visual Inspection:

In the visual inspection, the test specimens are tested for colour spots. The test is carried out on optical sample sheets having a thickness of 4 mm. If colour spots or colour streaks are visible with the naked eye, then the assessment is "poor". If no colour spots or colour streaks are visible, the assessment is "good".

Weathering:

Artificial weathering with xenon illumination is carried out according to standard ASTM G 155 in a CI-5000 Xenon Weatherometer from Atlas. Two borosilicate filters were used as UV filters. The irradiation intensity is 0.75 W/m²/nm at 340 nm. The black panel temperature is 80° C., the sample chamber temperature is 40° C. The samples are sprayed every 120 minutes for 18 minutes, the lighting being kept switched on also during the spraying phase. The above-mentioned weathering process is called Xe-Wom 0.75 W hereinbelow.

Particle Size Determination:

The particle size was determined by means of transmission electron microscopy using a microscope of type EM 208 from FEI Company (5651 GG Eindhoven, Netherlands). To that end, the IR absorber was ground by means of an agate mortar and then prepared by means of ultrasound in ethanol on a copper mesh support (for transmission electron microscopy). Images were made at 310,000 times magnification. The particle size was determined by means of image-analysis measuring methods in bright field contrast (evaluation of the particle size by grey value contrast).

Materials for Producing the Test Specimens:

Component a)

Linear bisphenol A polycarbonate with end groups based on phenol having a melt volume rate (MVR) of 6 cm³/10 min, measured at 300° C. and 1.2 kg load according to ISO 1033), denoted PC 1 hereinbelow.

Linear bisphenol A polycarbonate with end groups based on phenol having an MVR of 12.5 cm³/10 min, measured at 300° C. and 1.2 kg load according to ISO 1033), denoted PC 2 hereinbelow.

PC 2 also contains an additive mixture consisting of demoulding agent, heat stabiliser and UV stabiliser. Pentaerythritol tetrastearate (CAS115-83-3) is used as demoulding agent, triphenylphosphine (CAS 603-35-0) is used as heat stabiliser, and Tinuvin® 329 (CAS 3147-75-9) is used as UV stabiliser.

Component b)

Lanthanum hexaboride, $LaB_6$ (KHDS 872G2 from Sumitomo Metal Mining, Japan, CAS No. 949005-03-2). The product is in the form of a pulverulent dispersion. The weights indicated in the examples relate to the product KHDS 872G2, the solids content of lanthanum hexaboride in the commercial KHDS 872G2 dispersion used being 10.0 wt. %.

Caesium tungstate, $Cs_{0.33}WO_3$ (YMDS 874 from Sumitomo Metal Mining, Japan, Cas No. 1258269-41-8) is used as the IR absorber. The product is in the form of a dispersion. The weights indicated in the examples are based on caesium tungstate as the pure substance, the solids content of caesium tungstate in the commercial YMDS 874 dispersion used being 20 wt. %. The present tungstate is not zinc-stabilised.

Component c)

Black Pearls® 800 from Cabot Corp. are used as nanoscale carbon black (particle size about 17 nm) (CAS No. 1333-86-4).

Component d)

The product from A. (see below) is used as colouring agent of formula (1a, 1b).

The product from B. (see below) is used as colouring agent of formula (2a, 2b).

Macrolex Red EG (Solvent Red 135) from Lanxess AG, Leverkusen, is used as colouring agent of structure (4).

Paliogen Blue L 6385 (Pigment Blue 60) from BASF SE, 67065 Ludwigshafen, is used as colouring agent of structure (7). This colouring agent has a bulk volume of 7 l/kg, a pH value of from 6 to 9 and a specific surface area of 40 m²/g.

Heliogen Blue K 6911D from BASF SE, 67065 Ludwigshafen, Germany is used as colouring agent of structure (8b).

Colouring Agents for Comparison Examples

Macrolex Blue RR (Color Index: Solvent Blue 97; CAS: 32724-62-2) from Lanxess Deutschland GmbH is used as a further colouring agent not according to the invention.

Macrolex Violet 3R Gran. (Color Index: Solvent Violet 36; CAS: 61951-89-1) from Lanxess Deutschland GmbH is used as a further colouring agent not according to the invention.

Paliogen Blue L 6360 from BASF SE, 67065 Ludwigshafen is used as a further colouring agent, not according to the invention, having the structure (7). This colouring agent has a bulk volume of 1.7 l/kg, a pH value of from 4 to 7 and a specific surface area of 2 m²/g.

Preparation of the Polymer Compositions by Compounding:

Compounding of the additives was carried out on a twin-screw extruder from KraussMaffei Berstorff, type ZE25, at a case temperature of 260° C., or a melt temperature of 270° C., and a speed of 100 rpm, with a throughput of 10 kg/h, using the amounts of components indicated in the examples. For better mixing, a powder mixture of PC 1 (10 wt. % powder mixture, based on the total composition) containing the further components mentioned below is first prepared. This powder mixture is added to PC 2 in the compounding.

Production of the Test Specimens:

The granulate is dried for 3 hours at 120° C. in vacuo and then processed on an Arburg 370 injection-moulding machine having a 25-injection unit at a melt temperature of 300° C. and a tool temperature of 90° C. to form colour sample sheets measuring 60 mm×40 mm×Z mm; Z is 3.2, 4.0 or 5M mm.

Preparation of Substances of Component d)

In the examples according to the invention, structures of formulae (1a), (1b), (2a) and (2b) were used inter alia. The preparation of these colourants was carried out in accordance with DE 2148101 as follows:

A. Preparation of a 1:1 Mixture (wt. %) of (1a) and (1b):

5.62 g (0.025 mol) of benzene-1,2,4,5-tetracarboxylic acid dianhydride and 7.99 g (0.05 mol) of 1,8-diaminonaphthalene are placed in 75 ml of n-ethylpyrrolidone at room temperature and heated slowly to 150° C. Stirring is carried out for 5 hours at that temperature. After cooling, 125 ml of water are added and the resulting precipitate is filtered off. The precipitate is suspended several times in water and thus washed. The precipitate is dried under a high vacuum at 80° C. A mixture of 50 ml of glacial acetic acid and 25 ml of acetic anhydride is added to the dried precipitate. The mixture is boiled for 4 hours under reflux. After cooling, the reaction mixture is added to 500 ml of water. The precipitate is filtered off, washed with water and dried under a high vacuum at 80° C. 12.5 g of powder that gives a lilac colour are obtained.

B. Preparation of a 1:1 Mixture (wt. %) of (2a) and (2b):

6.71 g (0.025 mol) of naphthalene-1,4,5,8-tetracarboxylic acid dianhydride and 7.99 g (0.05 mol) of 1,8-diaminonaphthalene are placed in 75 ml of n-ethylpyrrolidone at room temperature and heated slowly to 150° C. Stirring is carried out for 5 hours at that temperature. After cooling, 152 ml of water are added and the resulting precipitate is filtered off. The precipitate is suspended several times in water and thus washed. The precipitate is dried under a high vacuum at 80° C. A mixture of 50 ml of glacial acetic acid and 25 ml of acetic anhydride is added to the dried precipitate. The mixture is boiled for 4 hours under reflux. After cooling, the reaction mixture is added to 125 ml of water. The precipitate is filtered off, washed with hot water and dried under a high vacuum at 80° C. 13.7 g of powder that gives a lilac colour are obtained.

Lacquering of the Test Specimens:

The product SHP470FT (Momentive Performance Materials Inc. Wilton, Conn. USA) is used as primer. The product AS 4700 (Momentive Performance Materials Inc. Wilton, Conn. USA) is used as the protective lacquer.

Coating was carried out in a climate-controlled coating chamber as specified by the manufacturer in question at from 23 to 25° C. and from 40 to 48% relative humidity.

The test specimens were cleaned using so-called Iso cloths (LymSat® from LymTech Scientific; saturated with 70% isopropanol and 30% deionised water), rinsed with isopropanol, dried in the air for 30 minutes and blown with ionised air.

Coating of the test specimens is carried out by hand by the flooding method. The primer solution is poured over the sheet in the longitudinal direction starting from the upper edge of the small part, while the starting point of the primer on the sheet is at the same time guided from left to right over the width of the sheet. The primed sheet was exposed to the air until dust-dry as specified by the respective manufacturer while being suspended vertically from a clamp and was cured in a circulating-air oven (exposed to the air for 30 minutes at room temperature and cured for 30 minutes at 125° C.). After cooling to room temperature, coating of the primed surface with AS 4700 was carried out. After being exposed to the air until dust-dry, curing was carried out for 60 minutes at 130° C. in a circulating-air oven.

The thickness of the primer layer and the thickness of the topcoat can affect the weathering properties.

In order to achieve a sufficient and comparable protective action against weathering, the primer layer thickness for the following examples should be in the range from 1.2 to 4.0 µm and the thickness of the topcoat should be from 4.0 to 8.0 µm.

Examples having a light transmission of about 70%

Example 1

Example According to the Invention

A polymer composition containing the amounts of the following components is prepared by compounding. The amounts in wt. % indicated in the following examples are based in all cases on the total polymer composition. The amount required to make up to 100 wt. % is in each case polycarbonate.

Colouring agent A (component d)): 0.000260 wt. %
Paliogen Blue L 6385 (component d)): 0.000150 wt. %
Triphenylphosphine (component h)): 0.100000 wt. %
Lanthanum hexaboride (component b)): 0.022000 wt. %
PC 1 (component a)): 9.877590 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

Example 2

Comparison Example

A polymer composition containing the amounts of the following components is prepared as described above (Ex. 1):

Colouring agent A (component d)): 0.000245 wt. %
Paliogen Blue L 6360 (colouring agent for comparison examples): 0.000140 wt. %
Triphenylphosphine (component h)): 0.10000 wt. %
Lanthanum hexaboride (component b)): 0.02100 wt. %
PC 1 (component a)): 9.878615 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

Example 3

Comparison Example

A polymer composition containing the amounts of the following components is prepared as described above (Ex. 1):

Macrolex Violet 3R (colouring agent for comparison examples): 0.000360 wt. %
Macrolex Blue RR (colouring agent for comparison examples): 0.000020 wt. %
Triphenylphosphine (component h)): 0.100000 wt. %
Lanthanum hexaboride (component b)): 0.024500 wt. %
PC 1 (component a)): 9.875120 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

Examples having a light transmission of about 20%

Example 4

Example According to the Invention

A polymer composition containing the amounts of the following components is prepared as described above (Ex. 1):
Colouring agent A (component d)): 0.001200 wt. %
Paliogen Blue L 6385 (component d)): 0.001500 wt. %
Triphenylphosphine (component h)): 0.100000 wt. %
Lanthanum hexaboride (component b)): 0.051000 wt. %
BlackPearls 800 (component c)): 0.001200 wt. %
PC 1 (component a)): 9.845100 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

Example 5

Example According to the Invention

A polymer composition containing the amounts of the following components is prepared as described above (Ex. 1):
Colouring agent A (component d)): 0.001300 wt. %
Heliogen Blue K6911 D (component d)): 0.000900 wt. %
Triphenylphosphine (component h)): 0.100000 wt. %
Lanthanum hexaboride (component b)): 0.053000 wt. %
BlackPearls 800 (component c)): 0.001290 wt. %
PC 1 (component a)): 9.843510 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

Example 6

Comparison Example

A polymer composition containing the amounts of the following components is prepared as described above (Ex. 1):
Macrolex Violet 3R (colouring agent for comparison examples): 0.001560 wt. %
Paliogen Blue L 6385 (component d)): 0.001000 wt. %
Triphenylphosphine (component h)): 0.100000 wt. %
Lanthanum hexaboride (component b)): 0.048700 wt. %
BlackPearls 800 (component c)): 0.001370 wt. %
PC 1 (component a)): 9.847370 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

Example 7

Comparison Example

A polymer composition containing the amounts of the following components is prepared as described above (Ex. 1):
Colouring agent A (component d)): 0.000590 wt. %
Macrolex Blue RR (colouring agent for comparison tests): 0.001470 wt. %
Triphenylphosphine (component h)): 0.100000 wt. %
Lanthanum hexaboride (component b)): 0.049000 wt. %
BlackPearls 800 (component c)): 0.001470 wt. %
PC 1 (component a)): 9.847470 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

Example 8

Comparison Example

A polymer composition containing the amounts of the following components is prepared as described above (Ex. 1):
Colouring agent A (component d)): 0.000720 wt. %
Paliogen Blue L 6385 (component d)): 0.001500 wt. %
Triphenylphosphine (component h)): 0.100000 wt. %
Caesium tungstate (component b)): 0.021800 wt. %
BlackPearls 800 (component c)): 0.001770 wt. %
PC 1 (component a)): 9.874210 wt. %
PC 2 (component a)): 90.000000 wt. %
PC 2 contains the additives listed above under PC 2. PC 2 contains 0.270 wt. % demoulding agent, 0.025 wt. % heat stabiliser and 0.200 wt. % UV stabiliser, in each case based on the amount of PC 2 used.

TABLE 1

Starting data; unweathered; examples having a light transmission of about 70%

| Example | Thickness of the sheet [mm] | Primer/Topcoat [μm] | Ty % | $T_{DS}$ % | a* | b* | L* | Visual inspection |
|---|---|---|---|---|---|---|---|---|
| 1 (invention) | 4.0 | 1.8/5.5 | 71.13 | 52.76 | −0.93 | 2.26 | 87.55 | ok |
| 2 (comparison) | 4.0 | 1.8/5.5 | 72.25 | 54.10 | −0.81 | 2.44 | 88.09 | colour spots |
| 3 (comparison) | 4.0 | 1.7/5.0 | 71.77 | 53.28 | −1.06 | 2.20 | 87.86 | ok |

TABLE 2

$\Delta E$, $\Delta T_{DS}$, after weathering; examples having a light transmission of about 70%

| Ex | ΔE 1000 h | ΔE 2000 h | ΔE 3000 h | ΔTds 1000 h | ΔTds 2000 h | ΔTds 3000 h |
|---|---|---|---|---|---|---|
| 1 (invention) | 0.64 | 0.57 | 0.58 | 0.78 | 1.07 | 1.26 |
| 2 (comparison) | 0.71 | 0.60 | 0.54 | 0.75 | 1.00 | 1.16 |
| 3 (comparison) | 0.45 | 0.93 | 1.40 | 0.82 | 1.18 | 1.30 |

TABLE 3

Starting data; unweathered; examples having a light transmission of about 20%

| Example | Thickness [mm] | Topcoat [μm] | Ty % | $T_{DS}$ % | a* | b* | L* | Visual inspection |
|---|---|---|---|---|---|---|---|---|
| 4 (invention) | 4.0 | 1.8/5.5 | 21.15 | 16.82 | −0.42 | 0.97 | 53.12 | ok |
| 5 (invention) | 4.0 | 1.8/5.6 | 18.90 | 15.31 | −2.58 | 1.87 | 50.57 | ok |
| 6 (comparison) | 4.0 | 1.7/5.2 | 19.86 | 16.16 | −1.45 | 0.88 | 51.86 | ok |

TABLE 3-continued

Starting data; unweathered; examples having a light transmission of about 20%

| Example | Thickness [mm] | Topcoat [μm] | Ty % | $T_{DS}$ % | a* | b* | L* | Visual inspection |
|---|---|---|---|---|---|---|---|---|
| 7 (comparison) | 4.0 | 1.8/5.6 | 19.40 | 16.82 | −3.28 | 2.99 | 51.68 | ok |
| 8 (comparison) | 4.0 | 1.6/5.7 | 20.37 | 20.80 | −1.22 | 0.41 | 52.25 | ok |

TABLE 4

ΔE, $\Delta T_{DS}$, after weathering; examples having a light transmission of about 20%

| Ex | ΔE 1000 h | ΔE 2000 h | ΔE 3000 h | ΔTds 1000 h | ΔTds 2000 h | ΔTds 3000 h |
|---|---|---|---|---|---|---|
| 4 (invention) | 0.71 | 1.11 | 1.61 | 0.53 | 0.77 | 1.03 |
| 5 (invention) | 0.76 | 1.05 | 1.45 | 0.61 | 0.86 | 1.07 |
| 6 (comparison) | 1.33 | 2.61 | 3.73 | 0.63 | 1.01 | 1.34 |
| 7 (comparison) | 1.38 | 2.54 | 3.59 | 0.64 | 1.00 | 1.28 |
| 8 (comparison) | 1.04 | 1.54 | 2.13 | 3.59 | 4.80 | 5.44 |

As is clear from Table 2, the colour stability when using a colouring agent combination that is not in accordance with the invention (Example 3) is poorer as compared with Example 1 according to the invention.

Example 2, which is not according to the invention, exhibits colour spots as a result of inadequate dispersion of the colouring agent, which shows that, even with identical colouring agent combinations, the apparent density and specific surface area of the colouring agent play a deciding role.

As is shown by Examples 4 and 5 according to the invention in Table 4, only these colouring agent combinations exhibit high colour stability in conjunction with high IR stability (cf. Comparison Examples 6 and 7 with inadequate colour stability and Comparison Example 8 with inadequate IR stability).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A polymer composition comprising
    a. at least one transparent polycarbonate or copolycarbonate;
    b. at least one inorganic IR absorber selected from the group consisting of boride compounds, tungstates, and mixtures thereof,
    c. optionally an inorganic, nano-scale pigment,
    d. a colouring agent or a colouring agent combination having structures selected from:
  III. (1a) and/or (1b), (7)
  IV. (1a) and/or (1b), (4), (7)
  V. (1a) and/or (1b), (5), (7)
  X. (3), (4)
  XL. (3), (5)
  XIV. (3), (4), (7)
  XV. (3), (5), (7)
  XX. (1a) and/or (1b), (8b)
  XXI. (7), (4)
  XXII. (7), (5), wherein the structures are as follows:

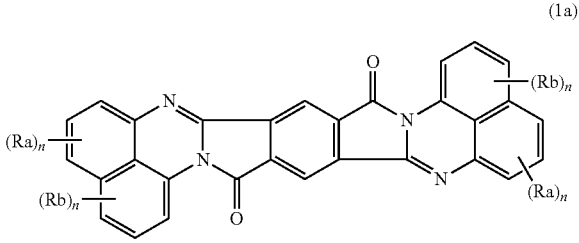

(1a)

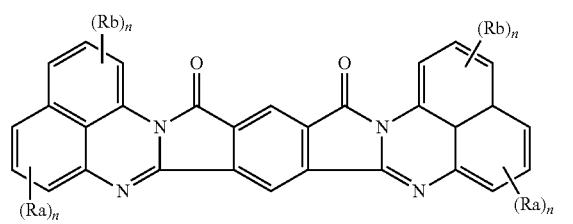

(1b)

wherein
Ra and Rb, independently of one another, represent a linear or branched alkyl radical, or halogen;
n, independently of the respective R, represents a natural number from 0 to 3, the radical for n=0 being H;

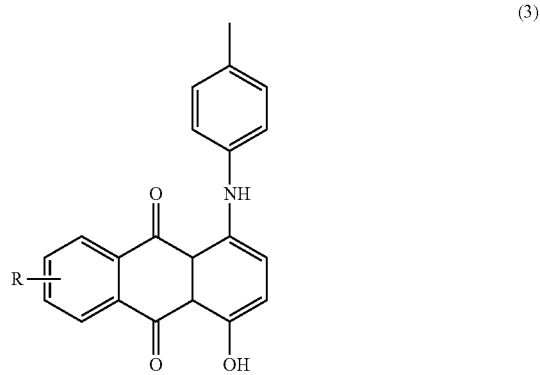

(3)

wherein
R represents H or a p-methylphenylamine radical;

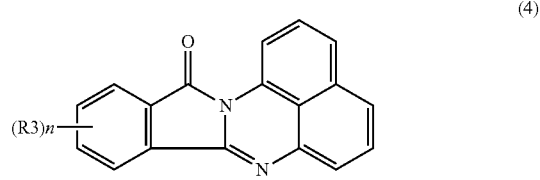

(4)

wherein
R3 represents a halogen;
n=4;

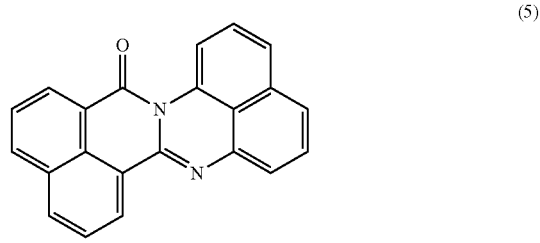

(5)

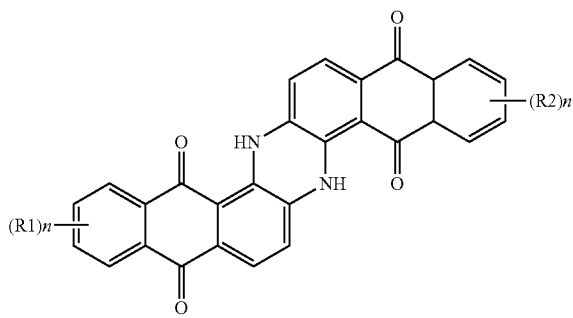

wherein
R1 and R2, independently of one another, represent a linear or branched alkyl radical, or halogen;
n represents a natural number from 0 to 4;
8b:

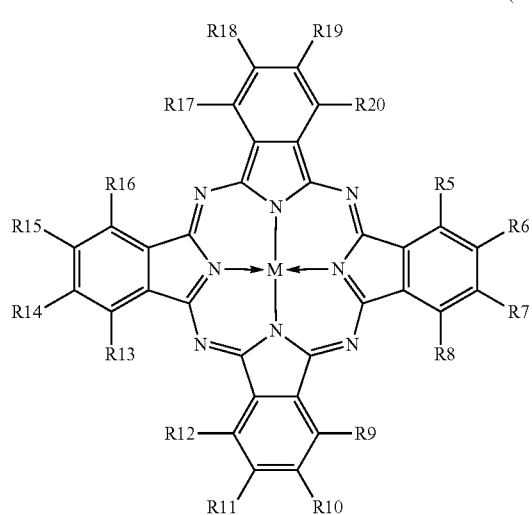

wherein
the radicals R(5-20), independently of one another, represents hydrogen, methyl, ethyl, propyl, isopropyl, butyl, isobutyl, tert-butyl, pentyl, neopentyl, hexyl, thexyl, fluorine, chlorine, bromine, sulfone or CN, and M represents aluminium, nickel, cobalt, iron, zinc, copper or manganese wherein the colouring agent of structure (7) has a bulk volume of from 2 to 10 l/kg, a specific surface area of from 5 to 60 m2/g, and a pH value of from 4 to 9, and wherein the nano-scale pigment is carbon black and the IR absorber is lanthanum hexaboride.

2. The composition according to claim 1, wherein the composition comprises the colouring agents of structures (1a) and (1b) in a 1:1 isomer mixture.

3. The composition according to claim 1, wherein the composition comprises the colouring agents of structures (1a) and (1b) in each case only in the form of a pure isomer.

4. The composition according to claim 1, wherein the composition comprises at least one colouring agent of structures (1a), (1b) or (7).

5. The composition according to claim 1, wherein the colouring agents of component d) and the colouring agents of component e) are present in a ratio of from 1:3 to 3:1.

6. The composition according to claim 1, wherein the thermoplastic plastic is a polycarbonate.

7. The composition according to claim 6, wherein the IR absorber is present in an amount of from 0.0015 wt. % to 0.015 wt. %, calculated as solids content of metal boride in the polymer composition as a whole, and the carbon black is present in an amount of from 0 wt. % to 0.00135 wt. %, based on the polymer composition as a whole.

8. The composition according to claim 1, wherein the colouring agents of component d) can be used in amounts of from 0.00001 wt. % to 0.3 wt. %, based on the individual component in question.

9. The composition according to claim 1, wherein the composition further comprises additives selected from the group of the UV absorbers, demoulding agents, heat stabilisers and processing stabilisers.

* * * * *